(12) United States Patent
Peer

(10) Patent No.: US 10,204,046 B1
(45) Date of Patent: Feb. 12, 2019

(54) HIGH-SPEED AND MEMORY-EFFICIENT FLOW CACHE FOR NETWORK FLOW PROCESSORS

(71) Applicant: Netronome Systems, Inc., Santa Clara, CA (US)

(72) Inventor: Edwin S. Peer, San Jose, CA (US)

(73) Assignee: Netronome Systems, Inc., Santa Clara, CA (US)

( * ) Notice: Subject to any disclaimer, the term of this patent is extended or adjusted under 35 U.S.C. 154(b) by 0 days.

(21) Appl. No.: 15/356,562

(22) Filed: Nov. 19, 2016

Related U.S. Application Data

(60) Provisional application No. 62/257,719, filed on Nov. 19, 2015.

(51) Int. Cl.
*G06F 12/00* (2006.01)
*G06F 12/0802* (2016.01)
*G06F 12/14* (2006.01)
*H04L 9/06* (2006.01)

(52) U.S. Cl.
CPC ...... *G06F 12/0802* (2013.01); *G06F 12/1408* (2013.01); *H04L 9/0643* (2013.01)

(58) Field of Classification Search
CPC . G06F 12/0802; G06F 12/1408; H04L 9/0643
See application file for complete search history.

*Primary Examiner* — Gurtej Bansal
(74) *Attorney, Agent, or Firm* — Imperium Patent Works LLP; T. Lester Wallace; Andrew C. Palmer

(57) ABSTRACT

The flow cache of a network flow processor (NFP) stores flow lookup information in cache lines. Some cache lines are stored in external bulk memory and others are cached in cache memory on the NFP. A cache line includes several lock/hash entry slots. Each slot can store a CAM entry hash value, associated exclusive lock status, and associated shared lock status. The head of a linked list of keys associated with the first slot is implicitly pointed to. For the other lock/entry slots, the cache line stores a head pointer that explicitly points to the head. Due to this architecture, multiple threads can simultaneously process packets of the same flow, obtain lookup information, and update statistics in a fast and memory-efficient manner. Flow entries can be added and deleted while the flow cache is handling packets without the recording of erroneous statistics and timestamp information.

20 Claims, 11 Drawing Sheets

MICROENGINE (ME) ISLAND

INTERNAL MU ISLAND

MU ISLAND SHOWING ATOMIC ENGINE IN DETAIL

"CAM128_LOOKUP24_ADD_INC" CPP COMMAND

32-BIT RETURN VALUE

ONE CACHE LINE

LOCK STATUS VALUE BITS

INPUT KEY FOR IPv4 PACKET

STORAGE OF KEYS  STORAGE OF POLICIES

HIGH-SPEED AND MEMORY-EFFICIENT FLOW CACHE FOR NETWORK FLOW PROCESSORS

CROSS REFERENCE TO RELATED APPLICATION

This application claims the benefit under 35 U.S.C. § 119(e) from U.S. Provisional Application No. 62/257,719, entitled "Improved Hash And Lock Caching Scheme," filed on Nov. 19, 2015, by Edwin Peer. The entirety of the disclosure of the foregoing document is incorporated herein by reference.

TECHNICAL FIELD

The described embodiments relate generally to flow caches for network flow processors.

REFERENCE TO ASCII TEXT FILE APPENDIX

This application includes an ASCII text file appendix containing source code that embodies the inventions described herein. A portion of the disclosure of this patent document contains material that is subject to copyright protection. All the material in the ASCII text file appendix is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights. The ASCII text file appendix includes the following text files that are readable in the MS-Windows operating system: 1) the file named "flow_cache_h.txt", is 19 KB large, created Nov. 18, 2016; 2) the file named "camp_hash_uc.txt", is 5 KB, created Nov. 18, 2016; and 3) the file named "flow_cache_uc.txt", is 188 KB, created Nov. 18, 2016.

BACKGROUND INFORMATION AND DISCLOSURE OF PRIOR ART

There are many different types of packet switching network devices. One type receives network packets on one of a plurality of input ports, and then for each packet performs a lookup to determine a policy specific for the flow to which the packet belongs. This policy includes an indication of one of a plurality of output ports. The lookup process is generally referred to here as the "flow cache" or it is said that the "flow cache" program or process performs the lookup. After the lookup, the packet is sent out of the network device on the indicated output port. A switch is an example of such a network device. A router is another example of such a network device. Several such network devices have been made using a particular Island-Based Network Flow Processor (IB-NFP) integrated circuit of the NFP-6XXX family of IB-NFPs available from Netronome Systems, Inc. of Santa Clara, Calif. This prior art integrated circuit is described in U.S. Pat. No. 9,146,920.

In a first type of prior art network device that employed the NFP-6XXX IB-NFP integrated circuit, the flow cache operated as set forth in U.S. Pat. No. 8,908,693. In one implementation, the policies for packet flows and the provisioning and setup of the flow cache was carried out statically before system operation. Flow policies and lookup entries were not added or deleted dynamically as the flow cache was operating in handling the switching of packets. In a second type of prior art network device that employed the NFP-6XXX IB-NFP integrated circuit, the flow cache involved use of cache lines that stored keys. Some cache lines were cached on the IB-NFP integrated circuit in a Dcache cache memory whereas other cache lines were stored outside the IB-NFP in a bulk memory. From the incoming packet, an incoming key was determined. From the incoming key a pair of hash values was determined. The first hash value was used to read a cache line from the Dcache memory. The second hash value was then compared against one or more entries that may have been stored in the cache line. If there was a detected match between the second hash value and an entry value stored in the cache line, the result was a looked up key. The incoming key was then compared to the looked up key to determine if there was a key match. A key match pointed to a policy. This identified policy was then be used to determine how to process the packet and how to output the packet from the network device. Hash collisions where multiple input keys hashed to the same second hash value were handled by loading multiple identical second hash value entries into the cache line, one for each of these different input keys. In a third type of prior art approach, the lookup performed on the cache line does not directly return a key, but rather it returns a pointer to a data structure or to a linked list. After the lookup in the cache line, a processor read of the cache line content is performed in order to obtain the pointer from another part of the cache line. The data structure or the linked list pointed to by this pointer stores a key/keys that is/are to be compared to the incoming key. The cache line entry associated with the data structure or the linked list can be locked. See U.S. Pat. No. 9,146,920 for disclosure of how such a data structure or linked list can be locked.

The NFP-6XXX IB-NFP integrated circuit that was used or was usable in implementing these multiple different prior art approaches had a transactional memory. The transactional memory in turn included a bus interface, an atomic lookup engine and a cache memory for storing cache lines. The atomic lookup engine was capable of reading cache lines from the Dcache memory, and then performing any one of multiple different types of lookup operations on the cache line information. One of these lookup operations was the CAM128_lookup24_add_inc. Another lookup operation that the lookup engine could perform was the ALAL (Atomic Look-up, Add and Lock) CAM_lookup_add_lock operation. These lookup operations are set forth on page 160 of the document: Netronome Network Flow Processor 6xxx, NFP SDK version5.0, Flow Processor Core Programmer's Reference Manual—PRELIMINAY DRAFT (2014). For additional information on the structure of the atomic lookup engine and its associated Dcache cache memory, see: U.S. Pat. No. 9,146,920.

SUMMARY

A network device includes a network flow processor integrated circuit and an amount of external bulk memory. The network device maintains a plurality of cache lines in a combination of a cache memory on the network flow processor integrated circuit and the bulk memory external to the network flow processor integrated circuit. Each of the cache lines includes a plurality of lock/hash entry slots. Each lock/hash entry slot can be occupied by a lock/hash entry, or can be vacant. A lock/hash entry includes an exclusive lock value, a multi-bit shared lock value, and an associated entry hash value. In one specific example, a 512-bit cache line includes four 128-bit quarter cache lines. The first quarter cache line includes four 32-bit lock/hash entry slots, where each lock/hash entry slot includes a 1-bit exclusive lock value slot, a 7-bit shared lock value slot, and a 24-bit entry hash value slot. For each of the lock/entry slots that is filled, there is an associated linked list of keys. The linked list can store one or more keys.

An incoming packet is received onto the network device. From various fields of the packet an input key is determined. From the input key a first hash value and a second hash value are determined. The first hash value is converted into an address that addresses one of the cache lines. More particularly, it addresses a Cache Line or Cache Line Portion (CL/CLP) which in one specific example is a quarter cache line of 128 bits. A thread of a flow cache program executing on the network flow processor supplies a lookup command to a lookup engine. The lookup command includes the address. The second hash value is pulled into the lookup engine as well. The lookup engine uses the address to read the addressed CL/CLP from the cache memory. The lookup engine compares the second hash value to each entry hash value (of each filled lock/hash entry slot) of the CL/CLP that is read. In one scenario, the lookup engine determines that the second hash value matches an entry hash value of one of the lock/hash entries of the CL/CLP. The exclusive lock value of this lock/hash entry had a prior value immediately prior to this. Likewise, the shared lock value of this lock/hash entry had a prior value immediately prior to this. In response to the determining that there was a match of the second hash value to an entry hash value of the lock/hash entry, the lookup engine automatically increments the shared lock value of the lock/hash entry, thereby generating an updated CL/CLP. The lookup engine then writes the updated CL/CLP back into the cache memory at the address. In addition to this, the lookup engine causes the prior value of the exclusive lock value and the prior value of the shared lock value (of the matching lock/hash entry) to be communicated back to the thread as part of a return value. The lookup engine does this lookup as an atomic operation, without further input from the thread. In response to receiving back the results value, the thread determines that the linked list (the linked list associated with the matching lock/hash entry) is not exclusively locked by another thread. The thread then traverses the linked list, checking it key by key to determine if the input key matches any stored key in the linked list. If a stored key is found that matches the input key, then an associated policy is read. The policy is stored at a memory location that can be determined from the memory location where the matching key was found. The policy indicates how the packet is to be processed and typically indicates an output port from which the packet is to be output from the network device.

Rather than the prior value of the exclusive lock value indicating that the linked list was not exclusively locked, the prior value of the exclusive lock value could have indicated to the thread that the linked list was exclusively locked by another thread. In such a case, the thread issues an instruction or instructions that cause the CL/CLP to be accessed and the shared lock value to be decremented. This effectively undoes the candidate shared lock obtained by the thread when the shared lock status value was incremented. After decrementing the shared lock value, the thread backs off in time before retrying the lookup operation again.

Advantageously, multiple threads can simultaneously have shared locks on the same linked list of keys at the same time. For example, one thread may be processing a first packet of a flow at the same time that a second thread may be processing a second packet of the same flow. Both threads may cause policy lookups to be performed, and both may update flow statistics (for example, packet count updates) for the flow, without having to wait for the other thread to release its lock on the linked list. Advantageously, a thread that holds a shared lock can also upgrade its lock to an exclusive lock. Due to the exclusive lock feature, flow keys can be added into a linked list associated with an entry hash value dynamically during flow cache operation and handling of packets. Likewise, flow keys can be deleted during dynamic operation of the flow cache. These additions and deletions can be carried out without causing erroneous statistics to be recorded.

In one novel aspect, the lock status information for a linked list is stored in the same cache line along with its associated entry hash value. This speeds flow cache operation and reduces the amount of memory accessing required between cache memory and bulk memory. If, on the other hand, the lock information were stored in another cache line, then a lookup attempt may cause two cache line misses as opposed to just one.

In one example, the lookup engine has an automatic hash entry adding feature. If the lookup engine is charged with doing a lookup operation on a hash value, and it finds no matching entry hash value stored in the CL/CLP, and if there is a vacant lock/hash entry slot in the CL/CLP, then the lookup engine automatically adds the hash value into the entry hash value slot of that vacant lock/hash entry slot. In another novel aspect, it automatically sets the lock status bits of the now-filled slot to indicate an exclusive lock. The requesting thread, upon receiving back the return value, learns that the hash value has been added to the CL/CLP and in response uses the exclusive lock of the linked list to add the key (to be the first entry of the associated linked list of keys). The policy for the flow is similarly added at a memory location associated with the linked list entry into which the key was loaded. In this way, a flow entry (an entry hash value, the key, and the policy) can be added into the flow cache quickly and efficiently. After the flow entry has been added, the thread can release the exclusive lock by writing to the CL/CLP and changing the value of the exclusive lock value for the lock/hash entry.

As compared to an approach in which the key is stored in the cache line and is obtained directly from a CAM lookup of a second hash value, the flow cache is more memory efficient. As compared to an approach in which every entry hash value has an associated head pointer to the associated linked list of keys, the flow cache is faster. In one novel aspect, there are four lock/hash entry slots in each CL/CLP. The linked list of pointers associated with the first lock/hash entry slot, however, is different from the others in that the memory location where the head of the linked list is found is obtained directly from the address of the CL/CLP. To find the head of this linked list, there is no need for the processor to read a head pointer. This consumes a bit of memory space because the associated memory location for the first lock/hash entry of each cache line has to be allocated even it may not actually be used (may not be filled), but the first lock/hash entry slot is more likely to be filled and contain a matching entry that the other lock/hash entry slots of the CL/CLP. Therefore the speed improvement due to not having to read head pointers for these first lock/entry slots is worth the nominal amount of memory space that might not be efficiently used. Each of the lock/hash entry slots two, three and four is provided with a head pointer, where these head pointers are stored in the same cache line along with the lock/hash entries. For these lock/hash entry slots two through four where matches are less likely, the more efficient use of memory resources at the expense of speed is elected. Overall the combination of an implicit head pointer for the first lock/entry slot and explicit head pointers for the other lock/hash entry slots tends to result in a superior memory usage and speed tradeoff.

Advantageously, there is a statistic value slot, a timestamp value slot, and a timeout value slot for the head of the linked list for each of the four lock/hash entry slots of the CL/CLP. The statistics associated with the head entries can be updated without accessing another cache line. This serves to reduce the number of cache lines that are dirtied, and thereby reduces the amount of accessing required between cache memory and external bulk memory.

For each cache line, there is an overflow linked list of keys. If the address points to the CL/CLP, and the second hash value is checked against four entry hash values in the four lock/hash entry slots, there may be additional keys that hashed to the first value that identified the CL/CLP. To be able to handle this situation, the CL/CLP is provided with an overflow link list of keys. Memory location slots of entries that can store keys in this list are allocated from a free list. When memory location slots are given up when a flow entry is removed, the address of the memory location slot is returned to the free list. Providing an overflow linked list for each cache line allows the number of lock/hash entry slots in the cache line to be held down to four, and this frees up other space in the cache line for the storage of head pointers, statistics values, timestamp values, and timeout values as set forth above.

In another novel aspect, the 64-bit hash (includes the 32-bit first bucket hash value, the 8-bit MU hash value, and the 24-bit second entry hash value) that is generated from the input key is generated using a hardware CRC32 engine. The hardware CRC32 engine outputs a 32-bit CRC value that serves as the basis for the 64-bit hash value. More entropy is added to the hash than is present in the thirty-two bits. This adding is done by maintaining sixty-four bits of state, where one of the thirty-two bit portions is loosely based on an accumulation of sums, and the other thirty-two bit portion is loosely based on an accumulation of XORs. These state values are in turn mixed with a combination of a cryptographic one-time pad and an unpredictable bit-wise rotation of the state. The result is a keyed-secured hash that has more bits of entropy than the 32-bit output of the 32-bit hardware CRC engine. There are secure software hash algorithms that generate sixty-four bits of entropy, but they are expensive in terms of processing. The advantage of the novel method described here is that the NFP can process each subsequent thirty-two bits of key in only five CPU cycles. Accordingly, each subsequent word of key only costs five CPU cycles.

Further details and embodiments and methods and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIGS. 12A, 12B, 12C, 12D and 12E together and in combination form the larger flowchart.

DETAILED DESCRIPTION

Reference will now be made in detail to some embodiments of the invention, examples of which are illustrated in the accompanying drawings.

Figure 1:
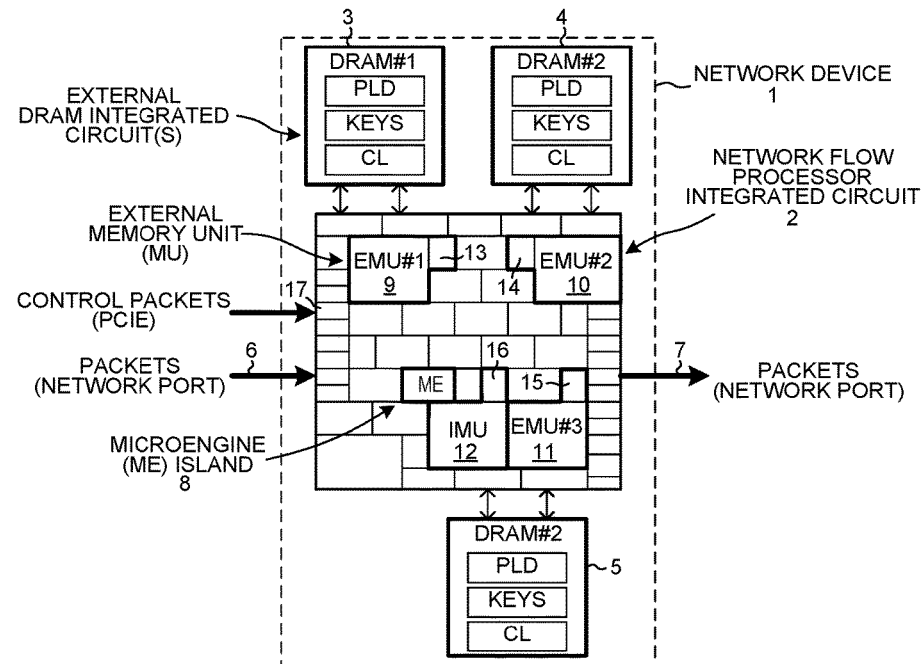
FIG. 1 is a diagram of a network device in accordance with one novel aspect.

FIG. 1 is a block diagram of a network device and system 1. The device 1 includes an Island-Based Network Flow Processor (IB-NFP) integrated circuit 2, and three external Dynamic Random Access Memory (DRAM) integrated circuits 3-5. The IB-NFP integrated circuit 2 includes a peripheral first area of input/output circuit blocks. Some of the input/output circuit blocks are for communicating network packets, such as IPv4 packets or IPv6 packets, into and out of the IB-NFP integrated circuit. Others of the input/output blocks are for interfacing the IB-NFP integrated circuit to the external DRAM integrated circuits 3-5. Others of the input/output blocks are for interfacing the IB-NFP to a host computer via a PCIe bus or buses. In the illustration, IPv4 network packets 6 are received onto the overall device and onto the IB-NFP via one of a plurality of physical and virtual input ports. In the illustration, IPv4 network packets 7 are output from the IB-NFP integrated circuit and out of the overall device via one or a plurality of physical and virtual output ports.

In addition to the first peripheral area of I/O blocks, the IB-NFP integrated circuit 2 also includes a second tiling area of islands. Each of these islands is either a full rectangular shape, or is half the size of the full rectangular shape. For example, the island 8 is a full island. This island is referred to as an ME island because it includes multiple "MicroEngine" (ME) processors. The functional circuits in the various islands of this second tiling area are interconnected by: 1) a configurable mesh Command/Push/Pull (CPP) data bus, 2) a configurable mesh control bus, and 3) a configurable mesh event bus. Each such mesh bus extends over the two-dimensional space of islands with a regular grid or "mesh"

pattern. In the case of the CPP data bus, functional circuitry in one island can use the CPP data bus to send a command to functional circuitry in another island, to read data from functional circuitry in another island, or a write data to functional circuitry in another island. For additional information on the CPP data bus, and CPP bus transactions, see: U.S. Pat. No. 9,146,920 (the entire subject matter of which is incorporated herein by reference).

In addition to the second tiling area, there is a third area of larger sized blocks. Each of the blocks 9-11 labeled "EMU" is an example of one such larger sized block. EMU stands for "External Memory Unit". Each of these larger blocks interfaces to the CPP bus and other islands via a companion MU half island. The block 12 labeled "IMU" is another example of a larger sized block. IMU stands for "Internal Memory Unit". This larger block interfaces to the CPP bus and other islands via a companion MU half island. As explained in further detail below, an ME processor in the ME island 8 can read from and write to external DRAM 3 via larger block 9 and MU half island 13. The processor in the ME island 8 can read from and write to external DRAM 4 via larger block 10 and MU half island 14. The processor in the ME island 8 can read from and write to external DRAM 5 via larger block 11 and MU half island 15. The processor in the ME island 8 can read from and write to internal SRAM in larger block 12 via MU half island 16. In a typical operation of the network device, a network packet is received from the left, passes into the IB-NFP integrated circuit via one of the input/output circuit blocks, passes through functional circuits of various islands of IB-NFP integrated circuit, and is then output to the right from one of the input/output circuit blocks of the IB-NFP integrated circuit on the right side of the network device. Similarly, the ME processor in the ME island 8 can communicate back and forth with a host computer via a PCIe bus and associated input/output circuit block or blocks 17.

For more detail on the IB-NFP 2, see: U.S. Patent Publication Number 20130219091, having U.S. patent application Ser. No. 13/399,888, U.S. Pat. No. 9,237,095 entitled "Island-Based Network Flow Processor Integrated Circuit", by Gavin J. Stark et al., filed Feb. 17, 2012 (the entire contents of which is hereby incorporated by reference). For additional detail on the structure and operation of the PCIe interface of the IB-NFP, see: U.S. patent application Ser. No. 14/172,844, entitled "Network Interface Device That Maps Host Bus Writes Of Configuration Information For Virtual NIDs Into A Small Transactional Memory", filed Feb. 4, 2014, by Gavin J. Stark et al. (the entire subject matter of which is incorporated herein by reference).

Figure 2:
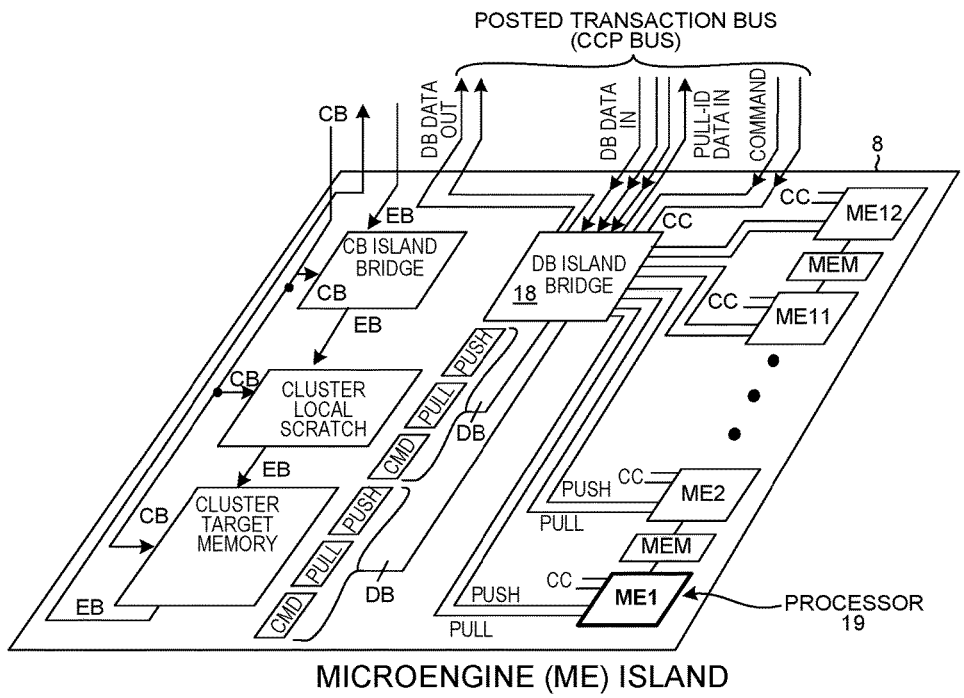
FIG. 2 is a simplified diagram of a MicroEngine (ME) island within the IB-NFP integrated circuit of FIG. 1.

FIG. 2 is a more detailed diagram of ME island 8. ME island 8 includes twelve ME processors ME1-ME12, a DB island bridge 18 and DB interface circuits, a cluster target memory, a cluster local scratch, a CB island bridge, and shared memories denoted MEM in the illustration. Reference numeral 19 identifies one of the ME processors. Each ME processor is a 32-bit multi-threaded RISC processing core having a RISC instruction set tailored to networking and communication applications. For further detail on the ME processor, its architecture, capabilities and instruction set, see: 1) the Intel IXP2800 Network Processor Hardware Reference Manual, pp. 1-430 (August 2004), and 2) U.S. Pat. No. 6,668,317, entitled "Microengine For Parallel Processor Architecture", by Bernstein et al. (the subject matter of which is incorporated herein by reference).

Figure 3:
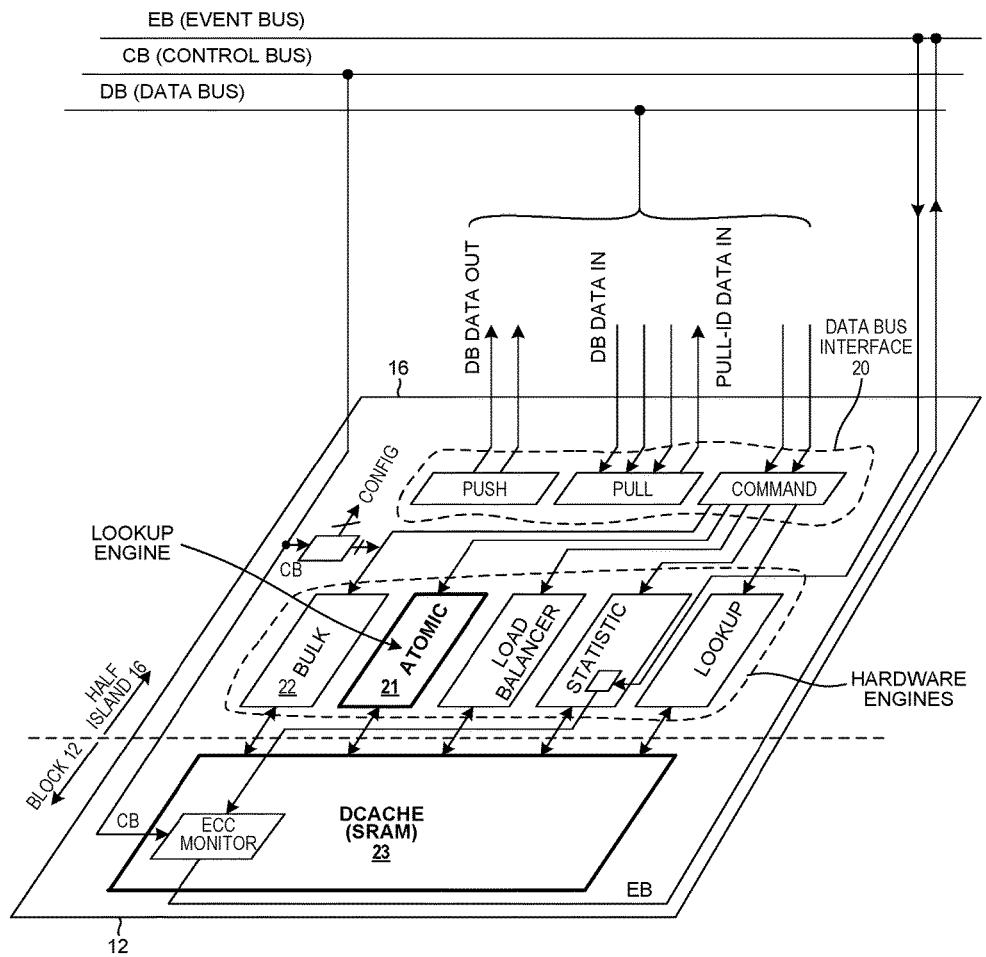
FIG. 3 is a simplified diagram of a memory unit (MU) half island and its associated memory block within the IB-NFP integrated circuit of FIG. 1.

FIG. 3 is a more detailed diagram of MU half island 16 and SRAM larger block 12. The MU half island/SRAM block pair is a transactional memory. The pair includes, among other things, a CPP data bus interface 20, an Atomic Engine (AE) 21, a bulk engine 22, and data cache ("Dcache") SRAM 23. Each of the EMUs of FIG. 1 is of identical construction to the IMU illustrated in FIG. 3, except that the EMU has no associated Dcache SRAM memory but rather has a companion memory in the form of external bulk DRAM.

Figure 4:
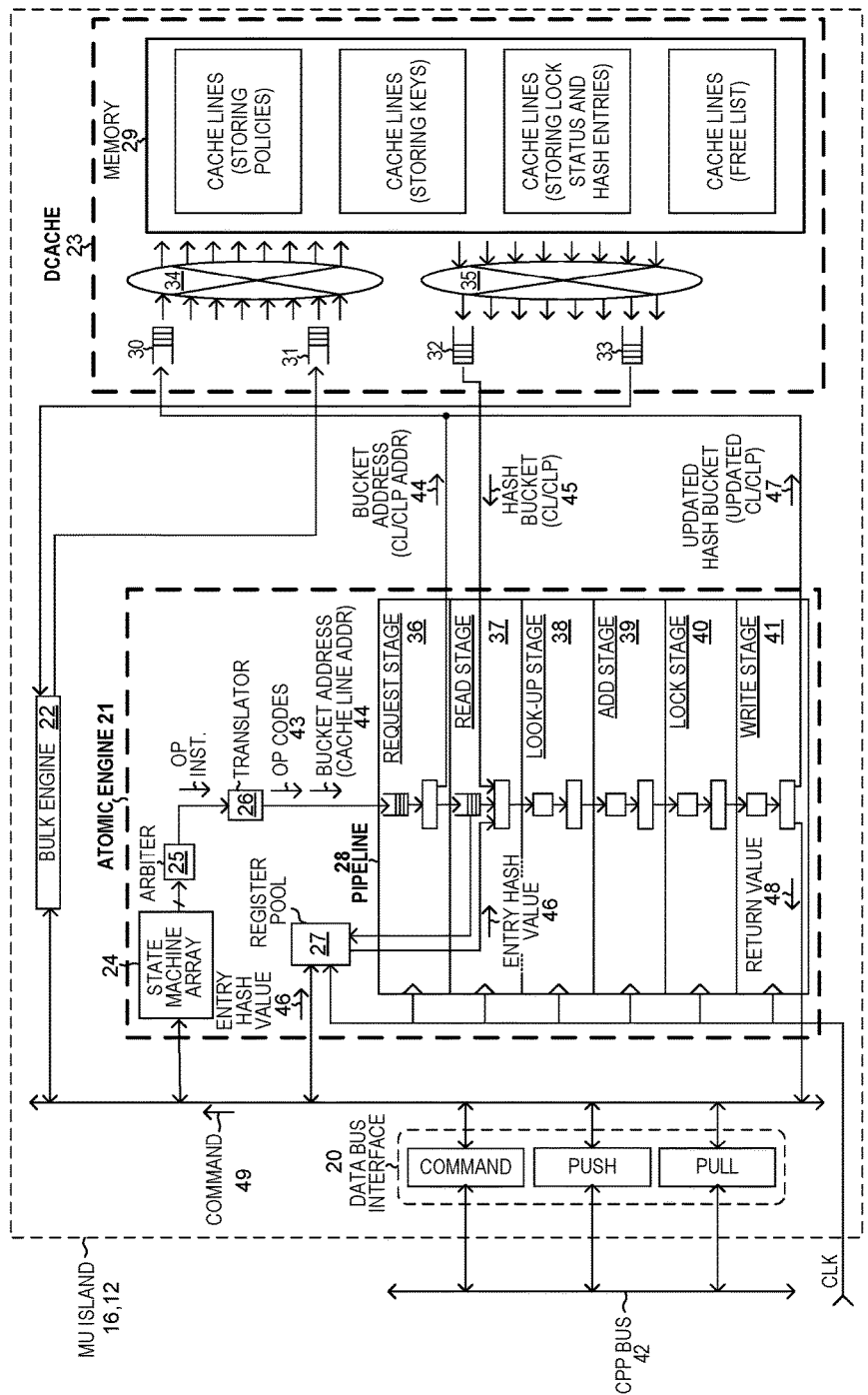
FIG. 4 is a diagram showing detail of the atomic engine and Dcache of the MU half island and memory block of FIG. 3.

FIG. 4 is a diagram that shows parts of the MU half island 16 and SRAM block 23 of FIG. 3 in more detail. For a general description the structure and operation of the atomic engine of FIG. 4, see: 1) U.S. Pat. No. 8,775,686, entitled "Transactional Memory That Performs An Atomic Metering Command", by Gavin J. Stark, filed Aug. 29, 2012; and 2) U.S. Pat. No. 9,146,920, entitled "Transactional Memory That Performs An Atomic Look-Up, Add and Lock Operation", by Gavin J. Stark et al., filed Sep. 10, 2012 (the entire subject matter of these two patent documents is hereby incorporated by reference).

Figure 7:
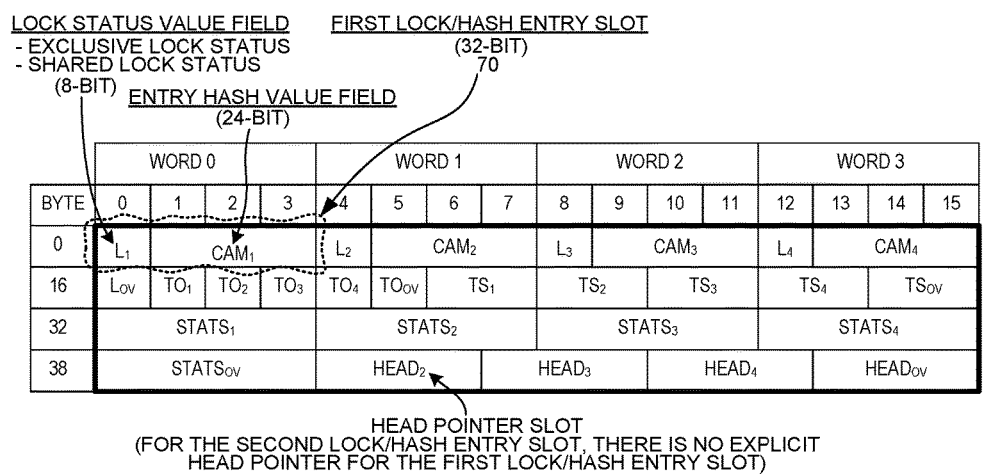
FIG. 7 is a diagram that shows the various parts of a cache line.

The atomic engine 21 of FIG. 4 includes a state machine array 24, an arbiter 25, a translator 26, a register pool 27, and a pipeline 28. Dcache 23 includes an SRAM memory 29, FIFOs 30-33, and two cross-bar switches 34 and 35. Each incoming FIFO of a crossbar switch has an associated arbiter. Each of the separate arbiters receives a separate request signal from each of the input FIFOs. Pipeline 28 includes a request stage 36, a read stage 37, a look-up stage 38, an add stage 39, a lock stage 40, and a write stage 41. A processor, such as processor ME1 19 of FIG. 2, can issue a CPP bus command 49 that is communicated across the CPP bus 42 and into the MU island of FIG. 4 to cause the atomic engine 21 and overall MU island to do an atomic lookup operation. The type of lookup operation is specified by the CPP bus command. One example of such a lookup operation is the "CAM128_lookup24_add_inc" atomic lookup operation. The CPP command 49 is converted by translator 26 into a set of opcodes 43. There is one opcode for each stage of the pipeline. Each opcode is supplied to its corresponding one of the stages of the pipeline to set up that stage to perform the appropriate function for the overall CAM128_lookup24_add_inc operation to be performed. The CPP command 49 also includes an address field. This address field contains an address, which in this case is an address 44 that is also supplied to the pipeline. The read stage sends the address 44 to the Dcache 23 to read a 128-bit quarter cache line addressed by the address 44. The Dcache 23 returns the quarter cache line 45 identified by the address 44. In the illustrated example, a cache line is 512 bits as shown in FIG. 7. The first 128-bit portion of this is the CL/CLP. The notation "CL/CLP" stands for cache line or cache line portion. In another example, rather than the pipeline just reading a quarter cache line out of the Dcache memory, the pipeline reads the entire 512-bit cache line out of the Dcache memory.

As is described in further detail below, the ME processor's 32-bit "write transfer register" contains a 24-bit "entry hash value". This 24-bit "entry hash value" 46 is pulled from the ME as part of the CPP bus operation, and is supplied to the read stage 37. The read stage, the look-up stage, and add stage, and a lock stage do various operations in sequential fashion using the content of the CL/CLP 45 read from Dcache 23 and using the entry hash value 46. If an updated CL/CLP is generated, then the updated CL/CLP 47 is written back into Dcache 23 by write stage 41. A 32-bit return value 48 generated by the pipeline 28 is also output from the pipeline and is returned via the CCP interface 20 and CPP bus 42 to the processor ME1 19 of FIG. 2. As part of the conclusion of the overall CPP bus operation, the return value 48 is loaded into the 32-bit "read transfer register" of the processor ME1.

Dcache 23 is a cache memory that caches 512-bit cache lines for bulk memory. Bulk memory in this case is the combination of the three external DRAM memories 3-5. The "CL" notation in FIG. 1 denotes cache lines that are stored in bulk memory. If the pipeline of the atomic engine 21 requests a read of a particular CL/CLP from Dcache 23, but the information requested is not present in the Dcache 23, then there will be a delay while the appropriate cache line is read out of bulk memory and is moved into the Dcache 23. From the Dcache 23, the addressed CL/CLP is supplied to the pipeline 28 of the atomic engine 21. This situation is referred to as a cache miss. If, on the other hand, the addressed CL/CLP was already present in Dcache 23, then there is no cache miss and no cache line need be retrieved from bulk memory. The addressed CL/CLP is read out of SRAM 29 and is supplied back to the pipeline of the atomic engine. This situation is referred to as a cache hit. To speed circuit operation, cache misses are to be avoided.

Figure 5:
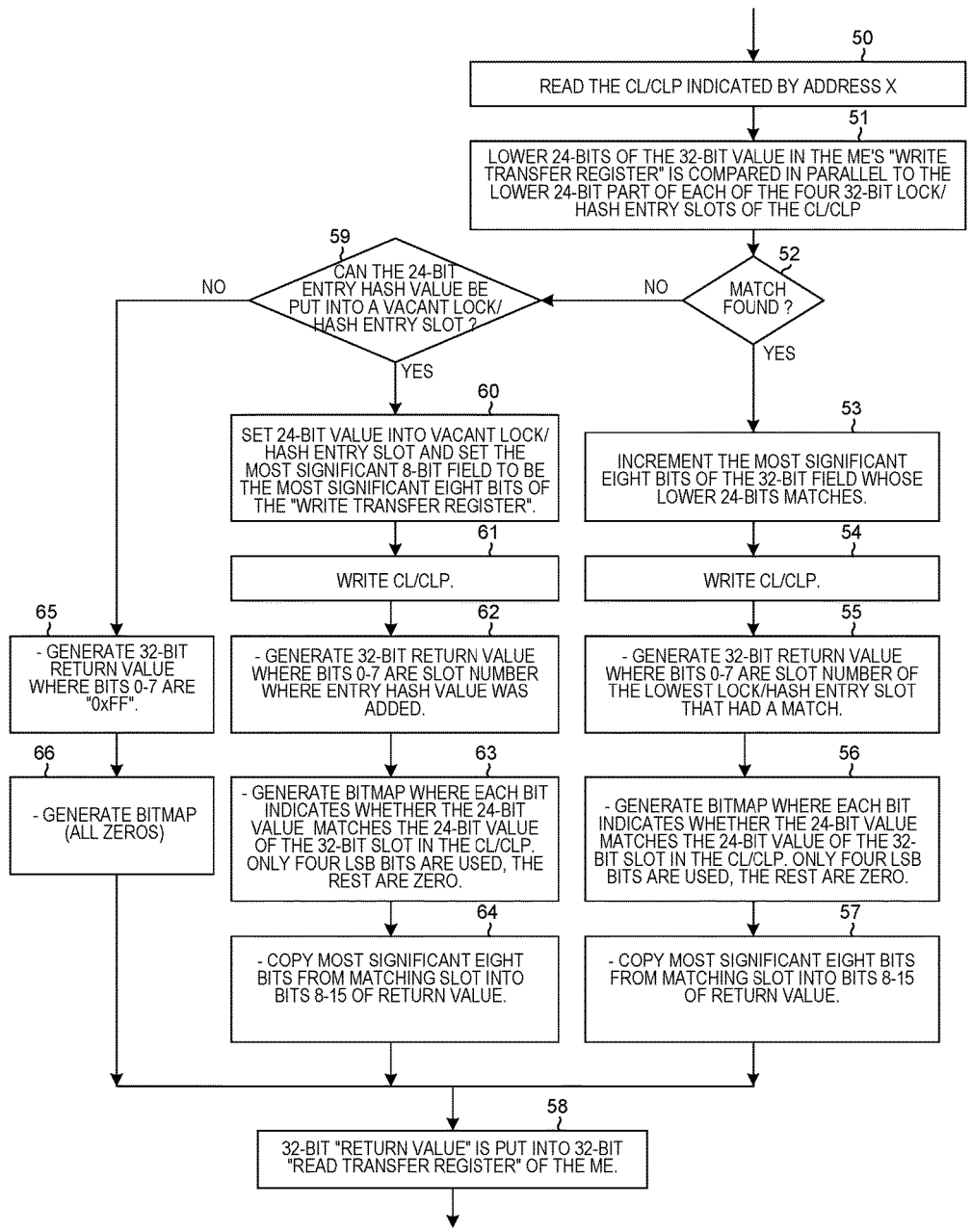
FIG. 5 is a flowchart that illustrates operations performed when the "CAM128_lookup24_add_inc" CPP bus command is carried out.

FIG. 5 is a flowchart that illustrates the CAM128_lookup24_add_inc operation and CPP command. From the perspective of other threads, the operation (initiated by the calling thread) is atomic. The 128-bit CL/CLP 45 indicated by the address field of the CPP command 49 is read by the atomic engine 21 (step 50) from Dcache 23. The address X in the address field is address 44 illustrated in FIG. 4. The 32-bit value in the processor's "write transfer register" is pulled across the CPP bus 42 and into the atomic engine 21. The pipeline 28 of the atomic engine then compares (step 51) the lower 24-bit part of the incoming 32-bit entry value in parallel to the lower 24-bit part of each of the four 32-bit "lock/hash entry slots" of the CL/CLP. The pipeline does four CAM comparisons in parallel at the same time. The four 32-bit bit fields of the CL/CLP 45 are referred to here as "lock/hash entry slots". The lower 24-bit part of the 32-bit value pulled out of the processor's "write transfer register" is the 24-bit "entry hash value" 46 illustrated in FIG. 4.

If a match is found (step 52), then the pipeline automatically increments (step 53) the most significant eight bits of the 32-bit lock/hash entry slot that contains the matching 24-bit entry hash value. The pipeline writes the resulting updated CL/CLP 47 back (step 54) into Dcache 23 at the address 44. In addition, the pipeline generates a 32-bit return value 48. Bits 0-7 of the return value 48 contain the slot number of the lowest entry hash value that matched (step 55). For example, if the 24-bit entry hash values in slots one and two both matched the incoming 24-bit entry hash value 46, then bits 0-7 of the return value 48 will contain the value 0x00 (the first matching slot). In addition, the pipeline generates a 16-bit bitmap (step 56), each bit of which indicates whether the 24-bit incoming entry hash value matches each corresponding one of the 32-bit slots of the 512-bit cache line. The operation is a CAM128_lookup24 operation, so only a quarter cache line (128 bits) is being compared, so only the four LSB bits of the bitmap are used. The remaining bits of the 16-bit bitmap are zeros. The pipeline also copies the most significant eight bits from the matching slot (the values these eight bits had immediately prior to the atomic lookup operation) and puts these eight bits into bits 8-15 of the return value 48 (step 57). The return value 48 is generated by pipeline stages before the write stage, so the generation of the return value by the pipeline overlaps the generation of the updated cache line in time. Once generated, the return value 48 is output from the pipeline and is communicated across the CPP bus 42 and back to the processor ME1 and is loaded into the processor's 32-bit "read transfer register" (step 58).

If at step 52 a match is not found, then the pipeline determines (step 59) whether the 24-bit entry hash value 46 can be added into a vacant lock/hash entry slot of the CL/CLP 45. If there is a vacant lock/hash entry slot, then the 24-bit entry hash value 46 is written (step 60) into the least significant 24-bit portion of the vacant 32-bit lock/hash entry slot. Simultaneously, the most significant eight bits of the "write transfer register" are written into the most significant 8-bit portion of the vacant 32-bit lock/hash entry slot. The pipeline writes the resulting updated CL/CLP 47 back (step 61) into Dcache 23 at the address 44. In addition, the pipeline generates a 32-bit return value 48. Bits 0-7 of the return value contain the slot number into which the entry hash value 46 was added (step 62). In addition, the pipeline generates a 16-bit match bitmap (step 63). The pipeline also copies the most significant eight bits from the matching slot (immediately prior to the atomic lookup operation) and puts these eight bits into bits 8-15 of the return value 48 (step 64). The return value 48 is output from the pipeline and is communicated across the CPP bus 42 and back to the processor ME1 and is loaded into the processor's 32-bit "read transfer register" to complete the CPP operation.

If at step 59 it is determined that the 24-bit entry hash value 46 cannot be put into a vacant lock/hash entry slot in CL/CLP 45, then the CL/CLP is not updated and is not written back into Dcache 23. The pipeline generates the 32-bit return value 48 where bits 0-7 are 0xFF (step 65). This 0xFF value is a code indicating that no match was found and that the entry hash value was not added into the cache line. The pipeline sets the bitmap bits of the return value to all zeros (step 66). The return value 48 is communicated across the CPP bus and back to the processor and is loaded into the processor's 32-bit "read transfer register" to complete the CPP operation (step 58).

Figure 6:
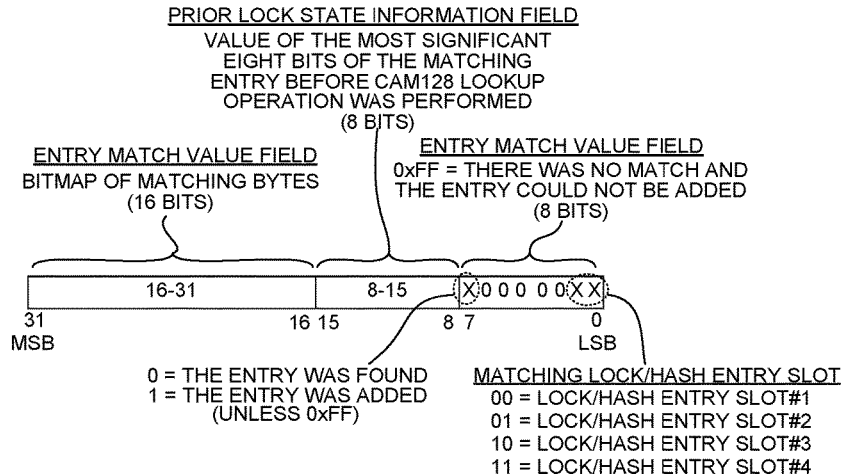
FIG. 6 is a diagram that shows the various parts of the 32-bit return value.

FIG. 6 is a diagram that illustrates the various parts of the 32-bit return value. Bits 0 and 1 indicate the slot number of the lowest lock/hash entry slot to contain a matching 24-bit value that matches the incoming 24-bit entry hash value. Only four slots are used for matching purposes, so only two bits are used to encode the slot number. Bit 7 indicates whether the incoming 24-bit entry hash value was found in any slot. If there was no match detected and the incoming 24-bit entry value could not be added into a vacant lock/hash entry slot, then the value of bits 0-7 are set to be 0xFF. Bits 8-15 are eight bits that contain the most significant eight bits of the slot containing the matching entry, where the value of these eight bits is the value before the CAM128 lookup operation was performed. Bits 16-31 are the 16-bit bitmap. This return value is written back into the 32-bit "read transfer register" of the ME at the conclusion of the CPP operation.

FIG. 7 is a diagram that illustrates the format and content of a 512-bit cache line. The first four words of the cache line are the CL/CLP 45 of FIG. 4. Reference numeral 70 identifies the first one of the four lock/hash entry slots. In the terminology used here, a "slot" or "field" of the cache line can be "filled" or "occupied" with a "value" or an "entry", or it can be "empty" or "vacant". The terms "slot" and "field" are used interchangeably. The slot denoted $CAM_1$ is the 24-bit slot that may contain a 24-bit entry hash value. The field $L_1$ is the 8-bit lock status field. There may be a linked list of keys associated with each of these lock/hash entry slots. The head of the linked list associated with the first lock/hash entry slot is pointed to by an implicit head pointer. The term "implicit head pointer" means that the address of the head can be determined from address information about the lock/hash entry slot without resorting to looking up any stored head pointer. The head of the linked list associated with each of the second, third and fourth lock/hash entry slots is pointed to by an "explicit head pointer" value that is stored in a corresponding head pointer slot in the cache line. For example, HEAD$_2$ is the slot that can contain the stored head pointer that points to the head of the linked list associated with the second lock/hash entry slot. For each of the four lock/hash entry slots, the cache line includes a corresponding 32-bit statistics value. For example, STATS$_1$ is the slot that can contain the 32-bit statistics value for the first lock/hash entry slot 70. In addition, the cache line includes a 16-bit timestamp slot that can contain a 16-bit timestamp value. There is one such timestamp slot for each of the four lock/hash entry slots. For example, TS$_1$ is the 16-bit slot that can contain the 16-bit timestamp value for the first lock/hash entry slot 70. In addition, the cache line includes an 8-bit slot that can contain an 8-bit timeout value. There is one such timeout slot for each of the four lock/hash entry slots. For example, TO$_1$ is the 8-bit timeout slot that can contain an 8-bit timeout value for the first lock/hash entry slot 70. In addition to the four linked lists of keys for the four lock/hash entry slots, there can also be an "overflow" linked list for the cache line. The subscript "OV" in the diagram indicates a slot associated with this linked list. This overflow linked list has an associated 8-bit lock status slot L$_{OV}$, an associated 24-bit head pointer slot HEAD$_{OV}$, an associated 32-bit statistics slot STATS$_{OV}$, an associated 16-bit timestamp slot TS$_{OV}$, and an associated 8-bit timeout slot TO$_{OV}$.

A statistics, timestamp or timeout value associated with a key that is not stored in the first entry of a linked list (either implicitly pointed to in the case of the linked list for the first lock/hash entry slot, or explicitly pointed to by a pointer in the case of the linked list for one of the second through fourth lock/hash entry slots) is not stored in the cache line of FIG. 7 but rather is stored in the cache line in memory unit MU+1 (modulo the number of memory units) where its associated key is stored.

Figure 8:
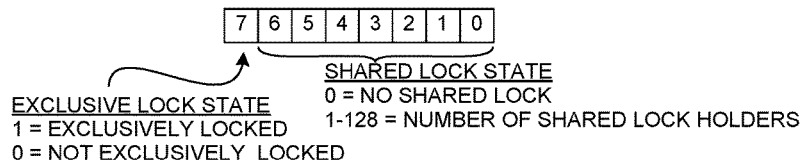
FIG. 8 is a diagram that shows the lock status value bits that may occupy a lock status value field of a lock/hash entry slot of the cache line of FIG. 7.

FIG. 8 is a diagram that sets forth the meaning of the lock status value bits in the 8-bit lock status field of a lock/hash entry slot. Bits 0-6 indicate the shared lock state. This is the number of threads that hold shared locks on the associated linked list. Bit 7 indicates whether the associated linked list is exclusively locked by a thread.

Figure 9:
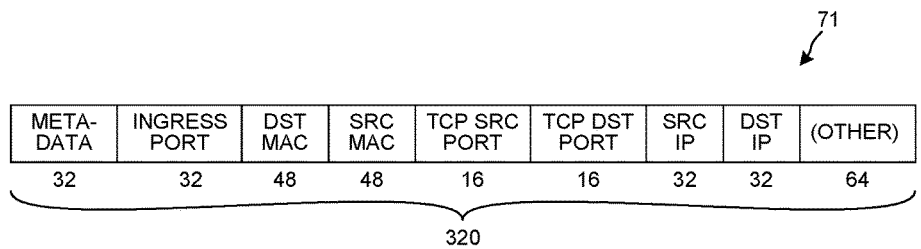
FIG. 9 is a diagram that illustrates how an input key can be generated from various parts of an incoming IPv4 packet.

FIG. 9 is a diagram that illustrates how an input key K$_1$ 71 can be generated from various parts of an incoming IPv4 network packet.

Figures 10, 11:
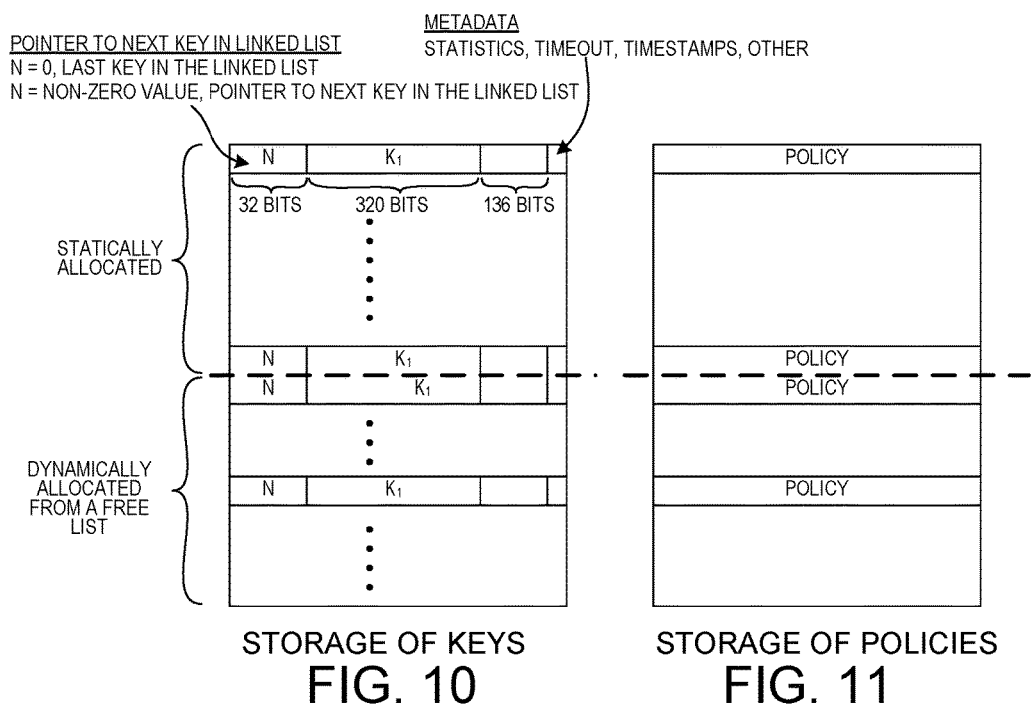
FIG. 10 is a diagram that illustrates how linked lists of keys are stored in a memory unit.
FIG. 11 is a diagram that illustrates how policies are stored in a memory unit.
Figure 12A:
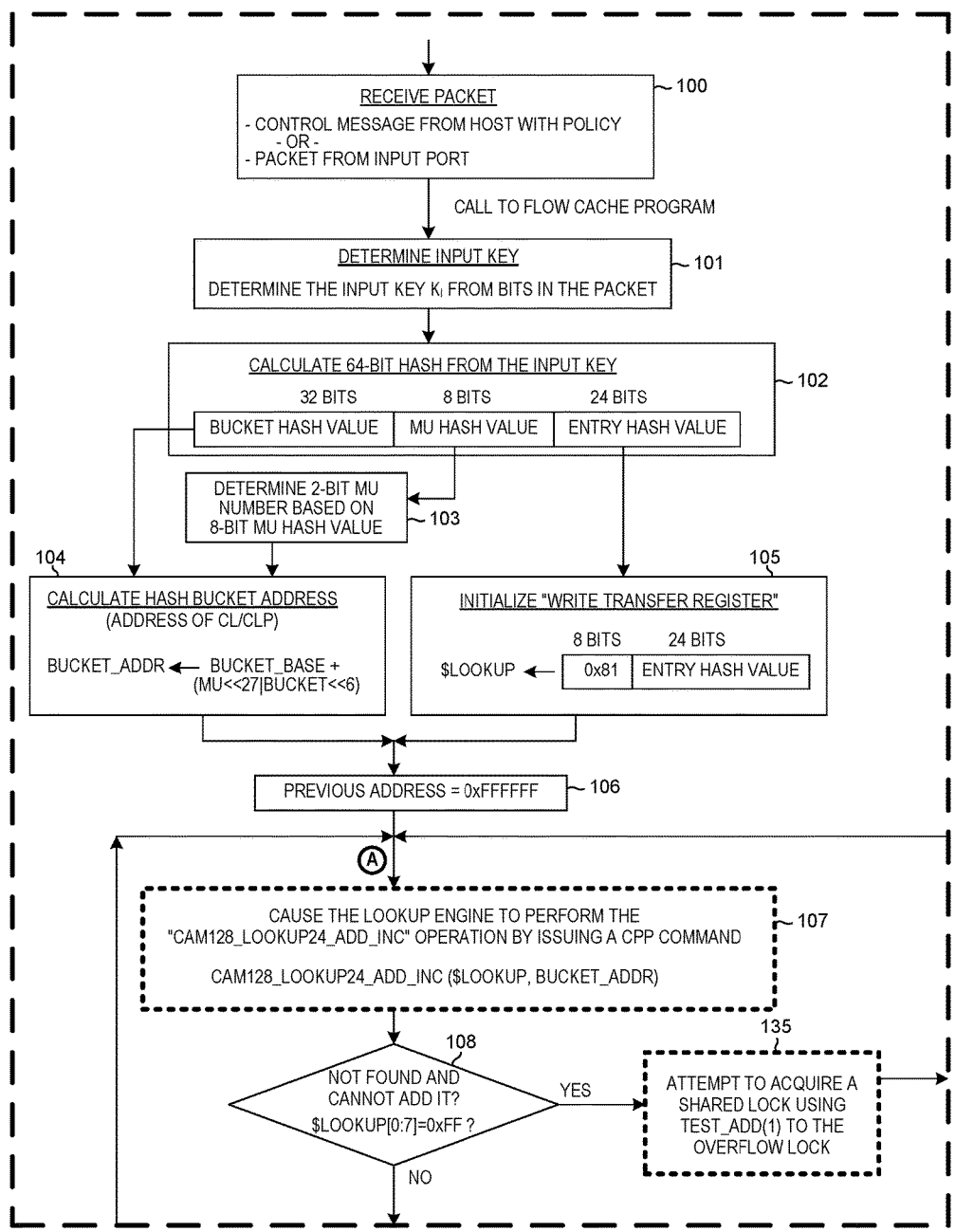
FIG. 12A is a flowchart diagram that is part of a larger flowchart.
Figure 12B:
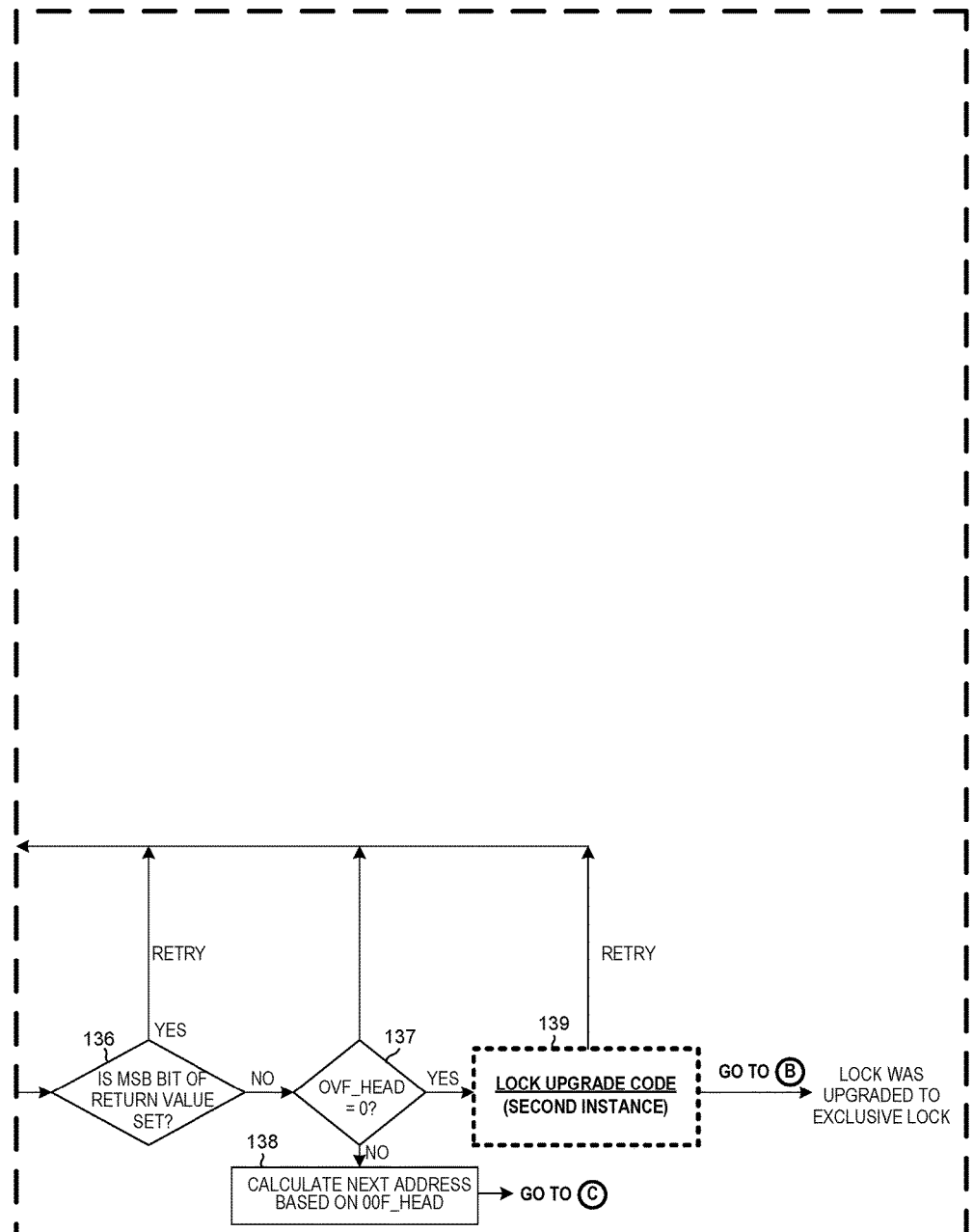
FIG. 12B is a flowchart diagram that is part of the larger flowchart.
Figure 12C:
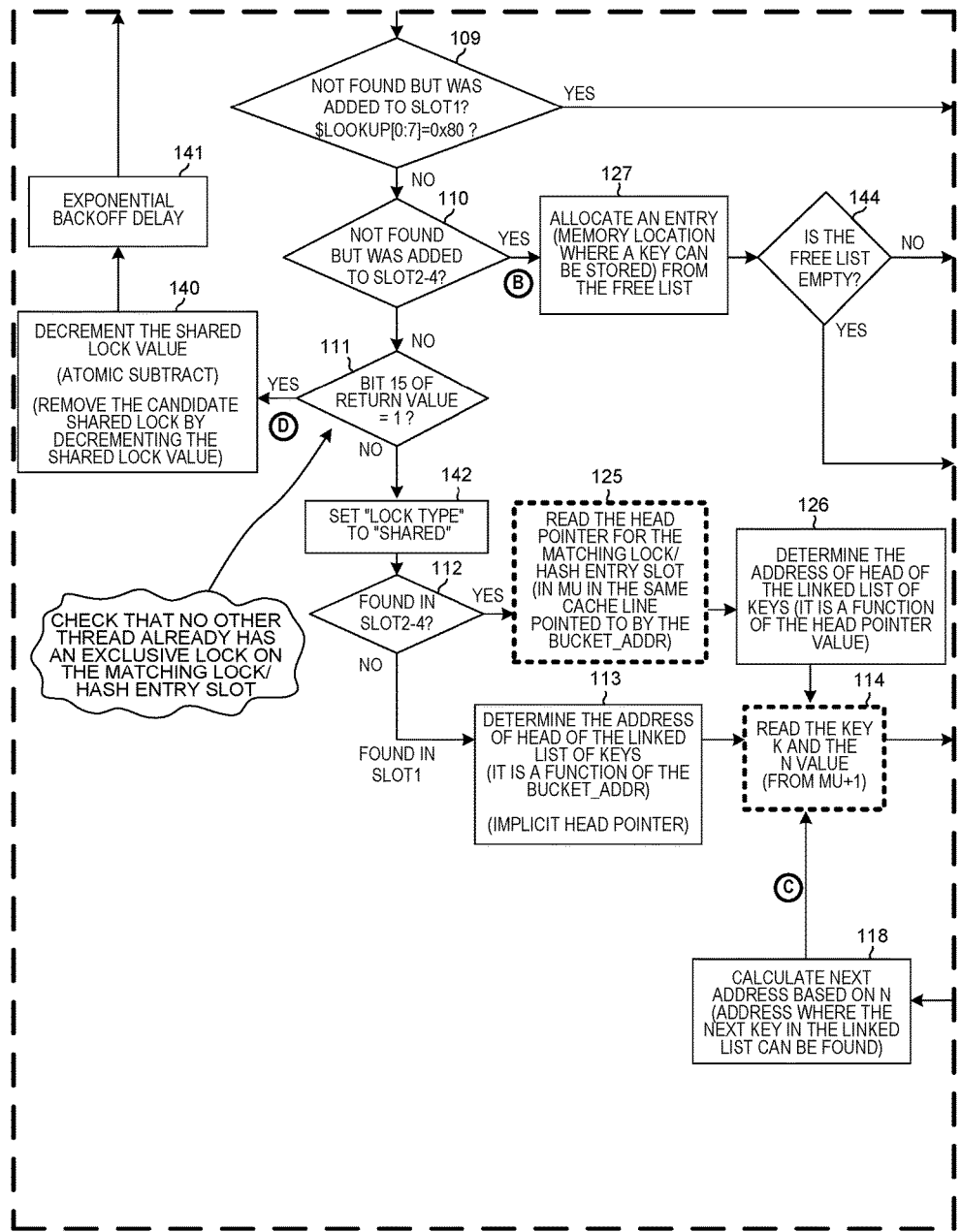
FIG. 12C is a flowchart diagram that is part of the larger flowchart.
Figure 12D:
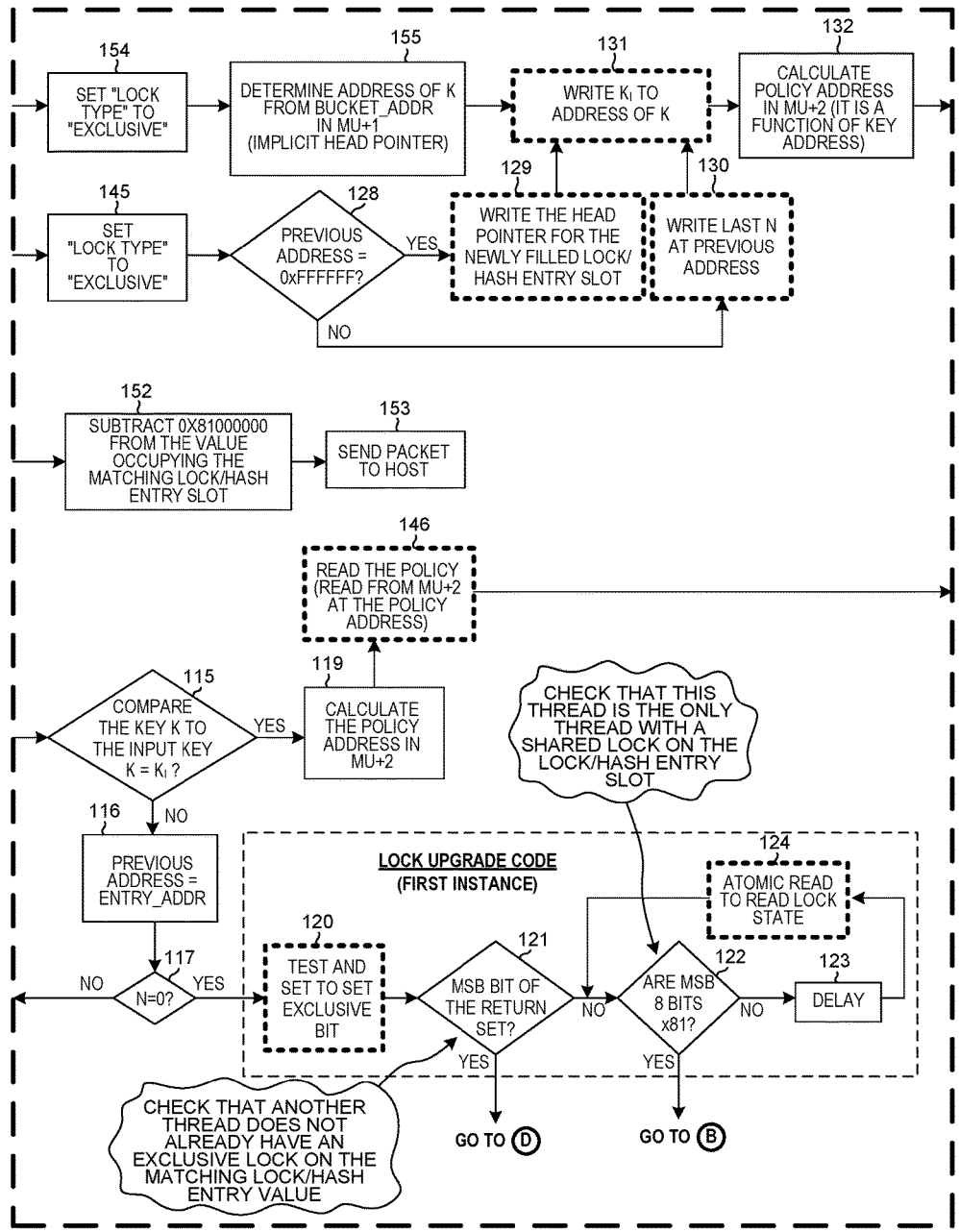
FIG. 12D is a flowchart diagram that is part of the larger flowchart.
Figure 12E:
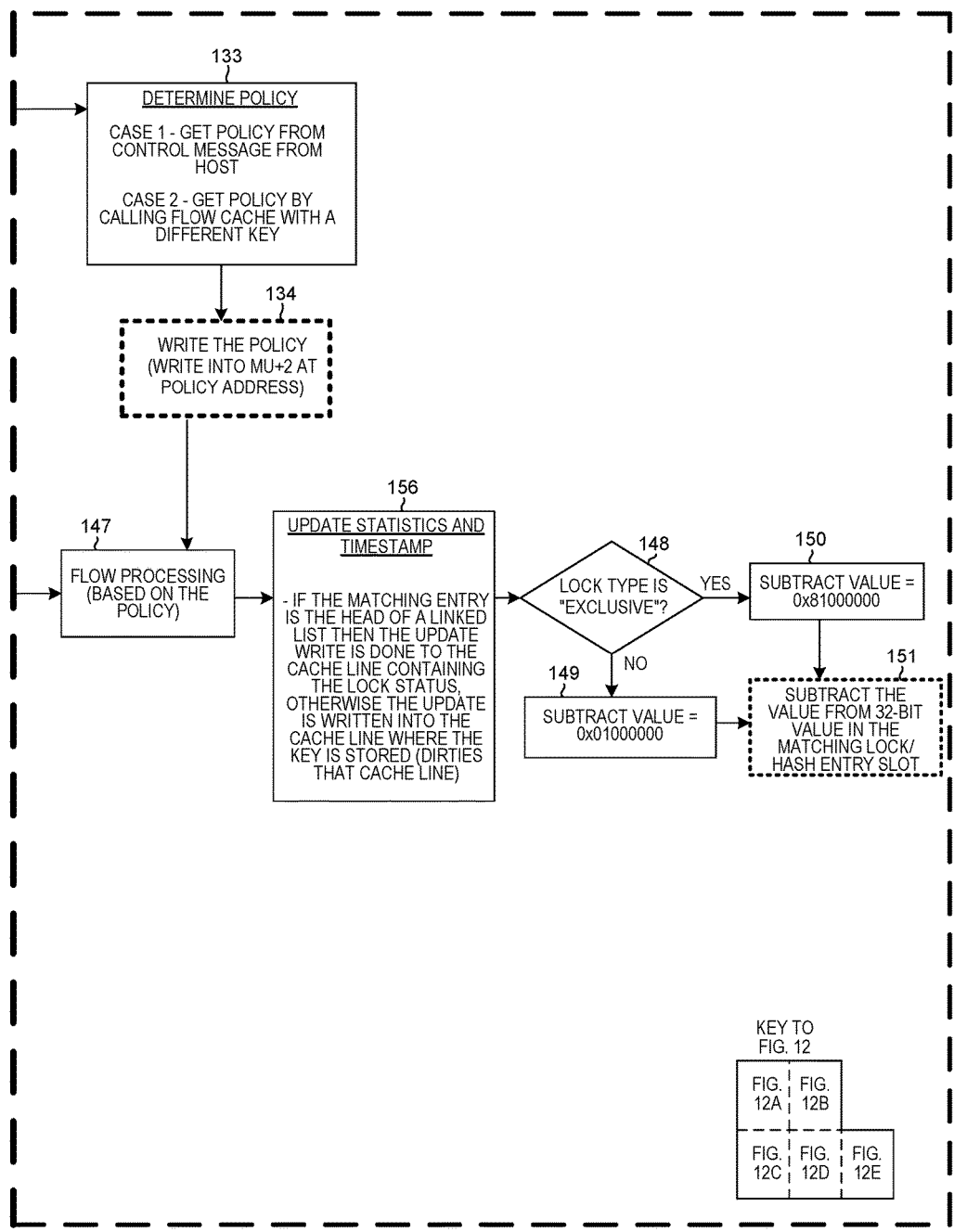
FIG. 12E is a flowchart diagram that is part of the larger flowchart.

FIG. 10 is a diagram that illustrates how linked lists of keys are stored in memory unit MU+1 (modulo the number of memory units). In this example, each memory location (cache line) may be made to store an entry. An entry includes a 32-bit bit N value, and an associated 320-bit key, and an amount of metadata. The metadata includes a statistics value associated with the matching key, a timestamp value associated with the matching key, a timeout value associated with the matching key, and other metadata. The top part of the memory space is statically allocated, whereas the bottom part of the memory space is dynamically allocated from a free list. The statically allocated memory space is statically allocated because implicit head pointers point to this area. Explicit head pointers can point into the dynamically allocated area. Memory locations can be coupled together in a linked list by their N values. In one of the memory locations for one the linked lists, if the N value of a given entry is zero (all bits are zeros), then this indicates that this entry is the last entry in the linked list. If the N value is other than all zeros, then the N value is an index that can be used to determine the address of the memory location that contains the next entry in the linked list. The free list is a list of unused memory locations.

FIG. 11 is a diagram that illustrates how policies are stored in memory unit MU+2 (modulo the number of memory units). There is a one-to-one mapping and relationship between entries that store keys in memory unit MU+1 as shown in FIG. 10 and entries in memory unit MU+2 that store corresponding policies as shown in FIG. 11. (Hereinafter the notation "MU+1" is understood to be "MU+1 modulo the total number of memory units", and "MU+2" is understood to be "MU+2 modulo the total number of memory units".) From address information pertaining to an entry that includes a key, the address in memory unit MU+2 where the corresponding policy is stored can be found.

FIGS. 12A, 12B, 12C, 12D and 12E form a flowchart that illustrates a method of flow cache program operation in accordance with one novel aspect. Two types of packets are received by the network device of FIG. 1. One type of packet is a control message received via the PCIe bus from the host computer. This may, for example, be a control message to instruct the flow cache to add a flow entry. This may, for example, be a control message to instruct the flow cache to delete a flow entry. Another type of packet received by the system is a general networking input packet received via an input port of the network device 1. In the present example, this packet is an IPv4 packet. For this type of packet, the overall result of the lookup operation is the lookup of policy information (a "policy"). The policy indicates, among other things, a physical and/or virtual output port from which the packet is to be output from the network device 1.

In step 100, a packet is received. In step 101, an input key K$_1$ is determined from certain bits of the packet as indicated in FIG. 9.

In step 102, a 64-bit hash is determined from the input key KI. The algorithm for determining this 64-bit hash consists of 4 distinct phases:

i) a global initialization phase executed once that populates a One Time Pad (OTP) with randomly generated data (this is cryptographic key material used to secure the hash). This OTP is reused for each packet processed by the flow cache, thus it is not truly an OTP in the manner it is employed by the hash algorithm, but it is used in the same fashion that OTPs are typically employed in other cryptosystems (just repeatedly). This reuse of pad material is necessary for a flow cache because a consistent hash algorithm is required to map subsequent packets in a flow onto the same flow entry. This apparent tradeoff in the security of the cyphertext in this application is acceptable in the context of a flow cache because a network based attacker would neither have access to the resultant hash value nor the flow cache memory that would be necessary to carry out any cryptanalysis. Crucially, the OTP is not being employed to protect the generated cyphertext, it is not the aspect being protected and is never exposed, but rather to make the output of the hash function unpredictable to an attacker. Furthermore, for more security, the OTP can be periodically regenerated at the cost of invalidating the contents of the flow cache (this is not, in general, an unacceptable cost depending on the frequency of such regeneration and the specific architecture of the system in which the flow cache is deployed);

ii) a per packet initialization phase that seeds each respective thirty-two bits of the 64-bits of hash state by mixing the length of the flow key into the hash state using the "exclusive or" (XOR) and the sum with subsequent 32-bit words of OTP material respectively. Additionally, two index registers are initialized to enable efficient access to the flow key and OTP material in the body of the algorithm;

iii) the body of the algorithm consists of an unrolled loop, so that the instructions in the loop are repeated for each thirty-two bits of flow key without incurring any branch penalties or additional instructions to maintain loop state for each iteration of the loop. Here execution begins by jumping to the appropriate location of this unrolled loop code so that the following 5 instructions ((a) through (e) below) denoted in the assembly language for the NFP are executed the appropriate number of times depending on the length of the key: (a) alu[_CAMP_HASH_STATE[0], _CAMP_HASH_STATE[0], +carry, _CAMP_HASH_LM_INDEX++] Here the first thirty-two bits of the hash state "_CAMP_HASH_STATE[0]" are permuted by summing it with the next word of the flow key "_CAMP_HASH_LM_INDEX++". The index register referring to the appropriate thirty-two bits of flow key is post-incremented so that the next time this instruction is executed in the loop it refers to the next thirty-two bits of flow key. The carry input for the ALU adder is derived from the corresponding ALU instruction from the previous iteration of the loop. This is achieved by means of the "+carry" mnemonic and by suppressing the condition code updates of the ALU operations that follow using the "no_cc" token in the remaining 4 instructions of the loop. The carry input for the first loop iteration is similarly derived from the summation performed during the initialization in step (ii) above: (b) alu[_CAMP_HASH_STATE[0], _CAMP_HASH_STATE[0], XOR, *n$index++], no_cc. Here the first thirty-two bits of hash state are permuted by an "exclusive or" (XOR) operation mixing the hash state with the next thirty-two bits of OTP material. In this case the OTP is stored in "next neighbor" registers of the ME and is accessed using an appropriately configured "*n$index" index register, also in a post-increment fashion so as to refer to the next thirty-two bits of OTP in subsequent iterations of the loop. The precise influence that the flow key has on the intermediate hash state during each iteration of the loop is thus unpredictable to an attacker: (c) crc_be[crc_32, copy, _CAMP_HASH_STATE [0]], no_cc. Here the first thirty-two bits of hash state is incorporated into a hardware CRC32 calculation using the "crc_be" ME instruction. The "crc_be" instruction as used above serves a dual purpose, it also causes the first thirty-two bits of hash state to be copied into another general purpose ME register "copy", the importance of which will become clear in step (e) below. The "crc_be" instruction is implemented in hardware as a multistage pipeline and may not be called again until at least one other ME instruction cycle has been executed. Fortuitously, this is of no consequence here as other useful work unrelated to the CRC32 calculation is performed by the loop's instructions: (d) alu[_CAMP_HASH_STATE[1], _CAMP_HASH_STATE [1], XOR, _CAMP_HASH_STATE[0]], no_cc. Here the present value of the first thirty-two bits of hash state are mixed into the second thirty-two bits of hash state using an "exclusive or" (XOR) operation. Thus, the first thirty-two bits of hash state accumulates an unpredictable permutation of sums and the second thirty-two bits of hash state accumulates a permutation of unpredictable "exclusive or" (XOR) operations: (e) dbl_shf[_CAMP_HASH_STATE[0], copy, _CAMP_HASH_STATE[0], >>indirect], no_cc. Here the 64-bit dbl_shf (double shift) instruction is used to effectively rotate the bits of the first thirty-two bits of hash state. The ">>indirect" in the instruction causes bits of the two arguments "copy" and "_CAMP_HASH_STATE[0]" to be shifted to the right by the number of bits specified in the least significant 5 bits of the first operand to the previously executed instruction in step (d). This 64-bit shift to the right achieves a 32-bit rotation of bits in the result because "copy" has the same value as "_CAMP_HASH_STATE[0]" as a consequence of the "crc_be" instruction executed in step (c). Thus, the least significant N right bits of "copy" become the most significant left bits of the result, precisely the same bits that were shifted out of the right least significant bits of the register. The number of bits shifted (N) is determined by the present value of the second thirty-two bits of hash state. The rotation operation achieves effective mixing without losing entropy in a single cycle and is further unpredictable because the inputs forming the present value of the second thirty-two bits of hash state depend on all the previous applications of the OTP in prior loop iterations;

iv) a finalization stage where the output of the CRC32 hardware operation is mixed into the hash state using a similar set of summation, "exclusive or" (XOR) and bit rotation operations. Importantly, the CRC output itself is also unpredictable because it too incorporated random values derived from the repeated application of the OTP at every step.

The 64-bit hash determined in step 102 includes a 32-bit bucket hash value portion (a "first hash value"), an 8-bit MU starting memory unit hash portion, and a 24-bit CAM entry hash value portion (a "second hash value"). In step 103, the 8-bit MU starting memory hash portion is converted into a 2-bit MU number. This 2-bit MU memory number identifies one of three memory units DRAM#1, DRAM#2 and DRAM#3 of FIG. 1. This memory unit will be considered to be the starting memory unit for the flowchart of FIG. 11. This memory unit number is used in the calculation of the hash bucket address. The hash bucket address is also referred to here as the cache line address because in this case the cache line of interest is the hash bucket. This hash bucket or cache line address includes bits that indicate which memory unit is being accessed.

In step 104, the so-called hash bucket address is determined based on: 1) a base address of the table of buckets (table of cache lines) which is located in memory, 2) the memory unit number, and 3) the 32-bit hash bucket portion. The hash bucket portion is scaled to the size of the buckets (64 bytes), so it is the bucket hash value multiplied by 64. This number is added to the base address in order to determine the hash bucket address in the appropriate memory unit. The hash bucket address is the CL/CLP address 44 in FIG. 4.

In step 105, the "write transfer register" of the ME is initialized. The 24-bit CAM entry hash value is loaded into the lower 24 bits of the 32-bit "write transfer register". The 8-bit value 0x81 is loaded into the upper 8 bits of the 32-bit "write transfer register".

The 32-bit "previous address" value is initialized to 0xFFFFFF. This previous address value is a value that indicates the address, of an entry in a linked list of keys, where the previously checked key value is stored. When the linked list is traversed, the "previous address" value is updated so that the value indicates the address of where the last checked key value was stored. In step 106, the previous address value is initialized to 0xFFFFFF and not to zero because 0x000000 is a valid address for the last key.

In step 107, the thread issues a CPP command that causes the lookup engine to perform the "CAM128_lookup24_add_inc" lookup operation. Issuance of a CPP command on the CPP bus is indicated in the diagram with a dotted box as opposed to a solid line box. The ME issues the CPP command onto the CPP bus. The atomic engine 21 in the MU island 16 is the target of the CPP command. The atomic engine is a type of lookup engine because it performs several types of lookup operations, one of which is the particular "CAM128_lookup24_add_inc" lookup operation of concern here. The atomic engine is therefore referred to in the description below as the "lookup engine". The "BUCKET_ADDR" value of the CPP command referred to in block 104 of FIGS. 12A, 12B, 12C, 12D and 12E is the address 44 in the Dcache memory 23 where a CL/CLP is found.

The lookup engine receives the CPP command, pulls the 32-bit value from the ME processor's write transfer register, and reads a 128-bit portion of a 512-bit cache line from the Dcache 23. The lookup engine performs the "CAM128_lookup24_add_inc" lookup operation on the 128-bit CL/CLP, and a 32-bit "return value" is determined by the lookup engine. This 32-bit return value is returned by completion of the CPP operation and is loaded into the ME's "read transfer register". The parts of the 32-bit return value generated by the lookup engine are set forth in FIG. 6. The 32-bit "return value" indicates whether or not the lookup engine found the entry hash value in one of the lock/hash entry slots in the cache line. If the lookup engine found the entry hash value in one of the lock/hash entry slots, then the "matching lock/hash entry field" of the 32-bit return value will indicate the lock/hash entry slot that matched the entry hash value. If the lookup engine does not find the entry hash value in the cache line, then the 32-bit return value will indicate whether the lookup engine then added it into a vacant one of the four lock/hash entry slots in the cache line. If the lookup engine did not find the entry hash value in the cache line and also cannot add it into a vacant lock/hash entry slot (for example, because there is no vacant slot), then the entry match value field of the 32-bit return value will contain the code 0xFF.

In 108, it is determined whether the 24-bit entry hash value was not found in any of the four lock/hash entry slots and also could not be added to any vacant lock/hash entry slot. This is a so-called "overflow" condition. If this condition is true, then the bits 0-7 of the "return value" would have been 0xFF. If these bits 0-7 of the return value are not 0xFF, then there is no "overflow" condition and processing proceeds to step 109.

In step 109, it is determined whether the 24-bit entry hash value was not found in any of the four lock/hash entry slots but was then added into lock/hash entry slot number one. In the carrying out of the CAM128_lookup24_add_or_inc operation, if the 24-bit entry hash value does not match one of the 24-bit entry hash values in one of the four lock/hash entry slots, but if one or more of the lock/hash entry slots is vacant, then the lookup engine of the MU island loads the 32-bit content of the "write transfer register" into the lowest numbered lock/hash entry slot. The lower twenty four bits of the 32-bit value in the "write transfer register value" is the 24-bit entry hash value that was being looked up. The upper eight bits of the 32-bit contents of the "write transfer register" are set to be 0x81. The upper eight bits are set to be 0x81 to indicate that the newly filled lock/hash entry slot and its associated linked list of keys is exclusively locked by the thread that filled the slot. The thread, in addition to setting the exclusive lock bit, sets the number of shared locks to be one because the thread also has a shared lock of the newly filled lock/hash entry slot and its associated linked list of keys.

If it is true that the 24-bit entry hash value was not found in one of the four lock/hash entry slots, and if it was then added into lock/hash entry slot number one, then bits 0-7 of the return value output by the lookup engine would have been 0x80. If the leading bit of the 0x80 bits of the return value is a "1", this indicates that the entry hash value was added. The bottom two bits of the 0x80 bits of the return value being "00" indicates that the entry hash value was loaded into the lock/hash entry slot number one. In such a case, the lock type variable is set to "exclusive" (step 154) and the address of the head of the linked list of keys is determined (step 155) from the address (the address of the CL/CLP, implicit head pointer). The input key $K_1$ is then written (step 131) into memory unit MU+1 at the determined address.

If, however, it is determined in step 109 that the 0-7 bits of the return value are not 0x80, then it is determined that the entry hash value was not added to the first lock/hash entry slot of the cache line, and processing proceeds to step 110. In step 110, it is determined whether the 24-bit entry hash value was not found in any of the four lock/hash entry slots but was then added into one of the other three lock/hash entry slots 2-4. In such a case, the bits 0-7 of the return value would be 0x81, or 0x82, or 0x82. If, however, the entry hash value was not added into one of lock/hash entry slots 2-4, then processing proceeds to step 111.

Whenever an entry hash value is added into a previously vacant lock/hash entry slot, the eight lock status bits in the cache line for that entry hash value are always written to be 0x81. The leading bit being a "1" indicates that the linked list of keys associated with the lock/hash entry slot is exclusively locked by a thread. The "1" in the LSB position indicates that there is one pending shared lock. The thread that caused the entry hash value to be added obtains the exclusive lock to the slot and also simultaneously always obtains a shared lock as well. For that reason, the leading eight lock bits of the lock/hash entry slot that are written upon an entry hash value being added are always 0x81.

In step 111, it is determined whether bit fifteen of the return value is a "1". As indicated in FIG. 6, bits 8-15 of the return value contain the 8-bit value of the eight lock status bits (for the entry hash value being looked up) immediately prior to execution of the CAM128_lookup24_add_operation. Bit 15 of the return value is therefore an indicator of whether the linked list for the matching entry hash value had been exclusively locked just immediately prior to execution of the lookup operation. The check of step 111 is a check to see if another thread already had an exclusive lock on the linked list for the entry hash value being looked up. If another thread already had an exclusive lock, then the current thread cannot continue with its lookup operation until the exclusive lock of the prior thread has been removed. The current thread cannot obtain either a shared lock or an exclusive lock until the exclusive lock of the prior thread has been removed. For example, another thread having the exclusive lock may be in the process of deleting the flow from the flow cache. In such a case, the current thread cannot access the linked list of keys for that entry hash value because doing so may result in erroneous information being used by the current thread. Accordingly, the lookup attempt is aborted, and after an amount of wait time at step 141 there is a retry back to step 107. Prior to proceeding back for the retry of the lookup operation, however, the 7-bit shared lock value is decremented by one in step 140. This decrement of the shared lock value is necessary because in reaching this point in the process for the current lookup, the 7-bit shared lock portion of bits 0-7 of the matching entry hash value had already been incremented due to execution of the CAM128_lookup24_add_or_inc" operation. This incrementing of the shared lock portion resulted in a sort of "candidate" shared lock. If, however, the linked list was then determined to be exclusively locked by another thread such that the current thread should abort its lookup attempt and retry later, then this "candidate" shared lock and its associated incrementing of the shared lock portion carried out by the CAM128_lookup24_add_or_inc should be undone prior to returning for a retry at step 107. The decrementing of step 140 is this undoing.

If, however, in step 111 it is determined that the linked list is not exclusively locked by another thread, then processing proceeds to step 142. In step 142, the lock type variable is set to the value "shared". This lock type variable is a variable for the particular thread of the ME carrying out the process of FIG. 11.

In step 112, it is determined whether the 24-bit entry hash value was found in any of the three lock/hash entry slots 2-4. If this were the case, then the bits 0-7 of the return value would have been the value of (0x01, 0x02, 0x03), and processing proceeds to step 125. If these bits 0-7 of the return value, however, do not contain one of those three values, then the entry hash value was found but it was found in the first lock/hash entry slot number one and processing proceeds to step 113.

If the entry hash value is found in lock/hash entry slot number one, then the address of the first key in the linked list for this entry is a function of the bucket address. This is referred to as an "implicit head pointer", because the address of the head of the linked list of keys is pointed to, and is a function of, the bucket address itself. In step 113, the address of the head of the linked list is determined. The determined address is then used (step 114) to read the first key and its associated N value. The first key is a 320-bit value and the N value is a 24-bit value. Both the first key and its associated N value are stored at the same address in memory unit MU+1. If the N value is zero, this indicates that the key is the last key in the linked list. Otherwise the N value is a pointer address that points to the memory location storing the next key in the linked list. In step 115, the key read from the current linked list entry is compared to the original key $K_1$. If the key read from the linked list does not match the original input key $K_1$, then the "previous address" value is set (step 116) to be the address of the entry just checked. If in step 117 it is determined that the N value is not zero, then the N value is a pointer to a next entry in the linked list. In step 118 the N value is used to calculate the address of the memory location where the next key is stored (stored in MU+1), and processing returns to step 114. The next key is read out of memory unit MU+1, and the traversal of the linked list of keys continues. If, however, the key that is read is determined in step 115 to match the original input key $K_1$, then the address where the matching key was found is used to calculate a corresponding policy address. This corresponding policy address is an address of a memory location in memory unit MU+2 where the policy for the key $K_1$ is stored. The policy can then be read out of memory unit MU+2. In one example, the policy indicates the exit port from which the packet is to be output from the network device. If, on the other hand, the last key in the linked list is reached (as determined by its N value being determined to be zero in step 117), then there was no match for the original key $K_1$ in the linked list. In such a case, processing proceeds to step 120.

If in step 112 it was determined that the 24-bit entry hash value was found in one of the three lock/hash entry slots 2-4, then in step 125 the head pointer corresponding to the matching slot is read. As indicated in FIG. 7, the cache line includes a 24-bit head pointer field for each of the three lock/hash entry slots 2-4. In step 126, the address of the first key in the listed list for the matching entry hash value is determined. Each entry is 128 bytes, so the head pointer is a 24-bit index that maps to the actual address where the key is stored in the MU+1 memory unit. The determined address is the base of the entry table holding the keys plus the number of statically allocated 128-byte entries, multiplied by the 128 byte size of the entries. This determined address is the address of the memory location where the first key in the linked list for the matching entry hash value is stored. In step 114, the ME thread uses the bulk engine 22 and a bulk engine CPP command to read the key using this determined address. The traversal of the linked list of keys is the same as described above.

In the "lock upgrade code (first instance)" block of FIGS. 12A, 12B, 12C, 12D and 12E, the end of the linked list of keys was reached but no matching key was found. The new key (of the present lookup attempt) is then to be added to the end of the linked list for the matching entry hash value. Only a shared lock is held by the thread at this point, but system operation requires that the thread hold an exclusive lock in order for it to be allowed to add a key to the linked list. In step 120, a "test and set" operation is used to set the top bit of the lock status bits for the entry. Multiple threads may, however, be attempting to obtain an exclusive lock like this at the same time. The "test and set" operation sets the bit indicating exclusive lock status, but returns back to the thread the prior value of the bit immediately before it was set. Accordingly, only one thread will receive back a zero value for the prior value of the bit. The thread that receives this prior value of zero upon performing the "test and set" operation knows that it was the thread that caused the bit to be set, so this thread knows that it has obtained an exclusive lock. If in step 121 it is detected that another thread had obtained the exclusive lock (because the exclusive lock status bit was already set), then processing must return to do another retry lookup. This is indicated in the flowchart by the notation "go to D". In such a case, the shared lock value must be undone by the decrement step 140 prior to the retry at step 107.

If, on the other hand, the current thread determines it is the thread that obtained the exclusive lock, there still may be multiple threads that have current shared locks on the lock/hash entry slot. The thread therefore waits for any such reader threads (that have shared locks) to exit and to release their shared locks. In step 124, the lock bit is repeatedly read after a delay at step 123 until in step 122 the MSB bit is detected to be set when there is only one shared lock. When this condition is detected, the current thread is the only thread holding the indicated shared lock and is the thread holding the exclusive lock. In such a case, the value of the lock status bits for the entry are 0x81. Processing then proceeds as indicated by "go to B".

In step 127, an attempt is made to determine a new location where the input key $K_1$ can be stored. The free list is consulted. If the free list is EMPTY at step 144 and there is no location where the input key $K_1$ can be stored, then processing proceeds to step 152. The value 0x81000000 is subtracted from the 32-bit value occupying the matching lock/hash entry slot at step 152, and the packet is sent to the host (step 153). This is an exception condition. If, however, the free list was not EMPTY at step 144, then the lock type variable is set to "exclusive" at step 145. An address is popped off the free list, and the input key $K_1$ will then be written into the location (in memory unit MU+1) pointed to by this address. A pointer, however, needs to be written to point to the new location where the key is now stored. There are two possibilities for how processing reached the point of step 127. In one case, processing came from decision diamond 110. In that case, there would have been no traversing of the linked list, so the "previous address" value would still be the initialized value of 0xFFFFFF. If the "previous address" value is determined still to be 0xFFFFFF in step 128, then the head pointer for the appropriate lock/hash entry slot is to be updated in step 129 to point to the newly allocated entry where the key will be stored. The location of the head pointer is directly determined from the lock/hash entry slot number. In the other case, the thread doing the current lookup was traversing a linked list, checking each key in that linked list for a match against the $K_1$ key value. As the linked list was traversed, the value of the address of the last key entry checked was tracked. This value is the "previous address" value. After the end of the linked list was reached and the key there was determined not to be a match for the $K_1$ value, processing proceeded to step 127. In step 127, a new entry was allocated by popping the free list, and the key $K_1$ will be stored at that newly allocated address, but then the N at the end of the linked list will need to be updated so that it will no longer indicate that it is the end of the linked list (is no longer zero) but rather will now point to the newly allocated entry which will be the new end of the linked list. So if in step 128 it is determined that the "previous address" variable value is no longer the initialized value of 0xFFFFFF, then N value of the entry identified by the previous address value is written in step 130 to point to the newly allocated address. In step 131, the input key $K_1$ is written into the newly allocated address. With the input key $K_1$ now having been stored, the policy associated with the key must be stored in memory unit MU+2. In step 132, the address of the memory location where the policy will be stored is calculated. This address, which indicates a memory location in memory MU+2, is a direct function of the address where the key was just written into memory unit MU+1. In step 133, the policy is determined. If the packet being processed is a control message received from the host, then the policy to be written is obtained from the control message. This policy had previously been stored in a combination of CTM memory in the ME island and in DRAM. The processor ME issues a CPP command to read the policy from where it is stored. If the packet being processed is a packet received via a network input port, then the policy is determined by calling the flow cache program again, but this time with a different key. This is effectively a lookup of a broader class of flows, where the broader class of flows includes the specific flow of the current lookup. If a match is found in the broader class of flows, then the policy assigned to that broader class of flows is copied to become the policy for the specific flow of the particular packet that is the subject of the current lookup. If no match is found in the broader class of flows, then the packet is sent to the host for classification and determining of a policy. After the policy has been determined in step 133, the policy is written in step 134 into the MU+2 memory at the determined address.

If a key is to be added due to a match of the entry hash value with the entry in the first lock/hash entry slot, then the determination of the address where the key will be written is determined as a direct function of the bucket address (address of the cache line). This is referred to as the "implicit head pointer".

If in step 108 it is determined that the bucket hash value identified a cache line but the entry hash value did not match any entry hash value stored in any one of the four lock/hash entry slots of the cache line, then the "overflow" linked list is checked to determine if the key was recorded in the overflow linked list. The overflow list is a linked list associated with the cache line (hash bucket) that stores keys whose entry hash values do not match an entry hash value stored in any one of the four slots of the cache line. In step 135, there is an attempt to obtain a shared lock on the overflow linked list. If another thread already holds an exclusive lock on the overflow linked list, then the lookup attempt of the current thread fails and the entire lookup must be retried. The "test and set" operation is therefore used to check to see if another thread has previously exclusively locked the overflow list when the shared lock was attempted. If in step 136 it is determined that the top bit of the return value was set, then there was an exclusive lock held by another thread and the lookup attempt is aborted and processing returns to step 107 for a retry. If not, then the head pointer of the overflow list is checked to determine if there is an entry in the overflow list. In step 137, if it is determined that the head pointer for the overflow list is zero, then there is no entry in the overflow list yet. In that case, the thread attempts to upgrade its shared lock to an exclusive lock so that it can add the input key $K_1$ to the overflow linked list. If the thread cannot upgrade its shared lock, then the lookup attempt fails and processing returns to step 107 of a retry. If the thread can upgrade its shared lock to an exclusive lock, then the head pointer of the overflow list is updated so that it will now point to the new entry. The input key $K_1$ is then stored in the new entry. If in step 137 the overflow head pointer is not zero, then there was something in the overflow list. The address of the next entry in the overflow list is calculated (step 138) using the pointer in the head of the overflow list. This next entry is then checked to see if the key stored there matches the key $K_1$. Processing proceeds traversing through the overflow linked list just like the previously described traversing of other linked lists. Processing therefore proceeds as indicated by the "go to C" notation in the flowchart. If the key $K_1$ is not found in the overflow linked list, then a memory location where the key $K_1$ can be stored is allocated and is added to the end of the overflow linked list and the key $K_1$ is stored there. The "go to B" notation indicates that processing is to return to step 127 where the attempted allocation of a memory location (to hold a new linked list entry) occurs.

Regardless of whether the policy was read out of memory unit MU+2 (step 146) or was written into memory unit MU+2 (step 134), flow processing is then carried out (step 147) in accordance with that policy. The type of flow processing is specified by the policy. Carrying out of the policy may result in the packet being dropped, the packet being sent out of the network device in ordinary fashion on a networking output port, or alternatively there may be no processing performed on the packet at all. If, for example, the packet is a "control message" packet then there would typically be little or no processing performed on the packet.

Statistics and timestamps are then updated (step 156). If the matching key was in the entry at the head of a linked list of keys, then the update write of the statistics and timestamp values is done to into a counter field in the cache line that contains the lock status information, otherwise the update is written into a larger counter field in the cache line where the key is stored. If the cache line where the key is stored is written, this potentially dirties that cache line which possibly implicates additional memory transfers to clean that dirtied cache line. The number of bits used to store statistics in the cache line with the lock status information is fewer than would be used to store statistics information in the cache line where a key is stored. The counter field in the cache line with the lock status is shorter than the counter field in the cache line with the key. Accordingly, periodically there is a transfer of the count stored in the cache line with the lock status into the larger counter field maintained in the cache line with the key. The providing of the shorter counter field in the cache line with the lock status information allows the processing cost associated with maintaining the larger statistics counter to be amortized because there are fewer updates to the larger counter field. The periodic transfer of statistics counts from the counter field in the cache line with the lock status information to the cache line where the key is stored is not drawn out in the flowchart of FIGS. 12A, 12B, 12C, 12D and 12E but rather is represented by block 156.

Next, the lock the thread has on the lock/hash entry slot is released. If the lock was an exclusive lock, then that lock must be released in one way. If, however, the lock was a shared lock, then that lock must be released in another way. In step 148, the type of lock is determined by examining the lock type variable. If the value of the lock type variable indicates that the lock was an exclusive, then a subtract value is set (step 150) to be 0x81000000. On the other hand, if the value of the lock type variable indicates that the lock was shared, then the subtract value is set (step 149) to be 0x01000000. To remove the lock, the subtract value is then subtracted (step 151) from the 32-bit value occupying in the matching lock/hash entry slot.

ASCII Text File Appendix: the ASCII text file appendix is part of this patent document and contains: 1) a header file (flow_cache_h.txt) that includes data structure descriptions and interface information, 2) a hash generator program (camp_hash_uc.txt) of code that receives the input key and that outputs a 64-bit hash, and 3) an implementation file (flow_cache_uc.txt) of the flow cache program, including the part of the flow cache illustrated in FIGS. 12A, 12B, 12C, 12D and 12E. All three files are assembly code and are supplied as inputs to an assembler. The assembler executes on a host computer. The assembler outputs machine code. There is also a loader program executing on the host computer. The machine code is loaded onto the NFP-6XXX IB-NFP integrated circuit of the network device 1 of FIG. 1 by the loader program such that the code is then stored into the appropriate ME processor code store in the appropriate ME island.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method, comprising:
   (a) maintaining a plurality of cache lines, wherein one of the cache lines includes a plurality of lock/hash entries, wherein each of the lock/hash entries comprises an exclusive lock value, a shared lock value, and an associated entry hash value, wherein some of the cache lines are stored in a cache memory and wherein others of the cache lines are stored in a bulk memory;
   (b) storing a linked list of one or more stored keys, wherein each of the one or more stored keys in the linked list hashes to the entry hash value;
   (c) determining a first hash value and a second hash value from an input key;
   (d) communicating the second hash value from a processor to a lookup engine;
   (e) reading a Cache Line or Cache Line Portion (CL/CLP) from the cache memory, wherein which CL/CLP is read in (e) is at least in part determined by the first hash value;
   (f) determining that the second hash value matches an entry hash value of one of the lock/hash entries of the CL/CLP read in (e), wherein the exclusive lock value of said one lock/hash entry had a prior value immediately prior to the determining of (f) and wherein the shared lock value of said one lock/hash entry had a prior value immediately prior to the determining in (f);
   (g) in response to the determining of (f) incrementing the shared lock value of said one lock/hash entry of the CL/CLP;
   (h) writing the CL/CLP back into the cache memory, wherein (e), (f), (g) and (h) are performed by the lookup engine as parts of a lookup operation;
   (i) communicating the prior value of the exclusive lock value and the prior value of the shared lock value from the lookup engine to the processor;
   (j) from the prior value of the exclusive lock value communicated in (i) determining that the linked list is not exclusively locked; and
   (k) traversing the linked list and checking to determine if the input key matches any stored key in the linked list.

2. The method of claim 1, wherein the determining of (f) involves the lookup engine simultaneously determining whether the second hash value matches any entry hash value of the plurality of lock/hash entries of the CL/CLP read in (e).

3. The method of claim 1, wherein the prior value of the exclusive lock value and the prior value of the shared lock value are communicated in (i) from the lookup engine to the processor as parts of a multi-bit return value.

4. The method of claim 1, wherein the prior value of the exclusive lock value and the prior value of the shared lock value are communicated in (i) from the lookup engine to the processor as parts of a multi-bit return value, wherein the multi-bit return value further comprises an entry match value, wherein the entry match value identifies a lock/hash entry whose entry hash value was determined in (f) to match the second hash value.

5. The method of claim 1, wherein the prior value of the exclusive lock value and the prior value of the shared lock value are communicated in (i) from the lookup engine to the processor as parts of a multi-bit return value, wherein the multi-bit return value further comprises an entry match value, wherein the entry match value includes a bit, wherein the bit indicates whether the second hash value was determined to match any entry hash value stored in the CL/CLP.

6. The method of claim 1, wherein the CL/CLP read in (e) is a part of a cache line, and wherein the cache line of which the CL/CLP includes a plurality of timeout values, wherein there is one and only one timeout value in the CL/CLP for each corresponding one of the plurality of lock/hash entries of the CL/CLP.

7. The method of claim 1, wherein a thread of a plurality of threads uses the exclusive lock value of a lock/hash entry to determine whether another thread has an exclusive lock on a linked list associated with the lock/hash entry.

8. The method of claim 1, wherein a thread of a plurality of threads uses the shared lock value of a lock/hash entry to determine whether another thread has a shared lock on a linked list associated with the lock/hash entry.

9. The method of claim 1, further comprising the step of: determining the input key from fields of a packet that was received onto an integrated circuit, and wherein the processor, the lookup engine and the cache memory are parts of the integrated circuit.

10. The method of claim 1, wherein (a) through (k) are all performed by an integrated circuit other than the bulk memory, and wherein the integrated circuit maintains cache lines stored in the bulk memory by controlling how the cache lines are written into and are read from the bulk memory.

11. The method of claim 1, wherein the CL/CLP read in (e) is a part of a cache line, and wherein the cache line of which the CL/CLP is a part includes a plurality of statistics values, wherein there is one and only one statistics value in the CL/CLP for each corresponding one of the plurality of lock/hash entries of the CL/CLP.

12. The method of claim 11, further comprising:
(l) a first thread using the lookup engine to initiate a first lookup operation that results in a match of a particular entry hash value of a particular lock/hash entry of a particular cache line, wherein the initiation of the first lookup operation results in the first thread obtaining a shared lock on a linked list associated with the particular entry hash value and updating a statistics value for the matching entry hash value, wherein the statistics value is stored in the particular cache line along with the entry hash value; and
(m) a second thread using the lookup engine to initiate a second lookup operation that results in a match of the particular entry hash value of the particular lock/hash entry of the particular cache line, wherein the initiation of the second lookup operation results in the second thread obtaining a shared lock on the linked list associated with the particular entry hash value and updating the statistics value for the matching entry hash value, wherein the second lookup operation is initiated by the second thread at a time when the first thread has its shared lock on the linked list, and wherein both the first and second threads have shared locks on the linked list for a period of time.

13. The method of claim 1, wherein the CL/CLP read in (e) is a part of a cache line, and wherein the cache line of which the CL/CLP is a part includes a plurality of timestamp values, wherein there is one and only one timestamp value in the CL/CLP for each corresponding one of the plurality of lock/hash entries of the CL/CLP.

14. The method of claim 13, further comprising:
(l) a first thread using the lookup engine to initiate a first lookup operation that results in a match of a particular entry hash value of a particular lock/hash entry of a particular cache line, wherein the initiation of the first lookup operation results in the first thread obtaining a shared lock on a linked list associated with the particular entry hash value and updating a timestamp value for the matching entry hash value, wherein the timestamp value is stored in the particular cache line along with the entry hash value; and
(m) a second thread using the lookup engine to initiate a second lookup operation that results in a match of the particular entry hash value of the particular lock/hash entry of the particular cache line, wherein the initiation of the second lookup operation results in the second thread obtaining a shared lock on the linked list associated with the particular entry hash value and updating the timestamp value for the matching entry hash value, wherein the second lookup operation is initiated by the second thread at a time when the first thread has its shared lock on the linked list, and wherein both the first and second threads have shared locks on the linked list for a period of time.

15. An apparatus comprising:
a cache memory that stores a plurality of cache lines, wherein each cache line includes a plurality of lock/hash entry slots, wherein a lock/hash entry slot may contain lock/hash entry, wherein each lock/hash entry comprises an exclusive lock value, a shared lock value, and an associated entry hash value; and
lookup engine means for:
(a) receiving onto the lookup engine means an address and an associated second hash value;
(b) using the address to read a Cache Line or Cache Line Portion (CL/CLP) from the cache memory;
(c) determining whether the second hash value matches any entry hash values of any lock/hash entries of the CL/CLP, wherein:
(c1) if the second hash value is determined in (c) to match any entry hash value of any lock/hash entry of the CL/CLP then the means increments the shared lock value of the lock/hash entry, wherein the means also generates a return value, wherein an entry match value field of the return value contains an entry match value that indicates that there was a match and also identifies a lock/hash entry whose entry hash value matched the second hash value,
(c2) whereas if the second hash value is determined in (c) not to match any entry hash value of any lock/hash entry of the CL/CLP and if the CL/CLP has a vacant lock/hash entry slot then the means causes the second hash value to be written into a vacant lock/hash entry slot, wherein the means updates the exclusive lock value of the lock/hash entry slot into which the second hash value was written to indicate an exclusive lock condition, wherein the means also generates a return value, wherein an entry match value field of the return value contains an entry match value that indicates that there was no match and also identifies the lock/hash entry slot into which the second hash value was written,
(c3) whereas if the second hash value is determined in (c) not to match any entry hash value of any lock/hash entry of the CL/CLP and if the CL/CLP does not have any vacant lock/hash entry slot then the means generates a return value, wherein an entry match value field of the return value contains an entry match value that indicates that there was no match and also indicates that the second hash value was not added to any lock/hash entry slot of the cache line;
(d) writing the CL/CLP back into the cache memory; and
(e) sending the return value out of the lookup engine means.

16. The apparatus of claim 15, wherein the exclusive lock value of the matching entry hash value in (c1) had a prior value immediately prior to the determining of (c) and wherein the shared lock value of the matching entry hash value in (c1) had a prior value immediately prior to the determining of (c), and wherein the return value generated in (c1) also includes the prior value of the exclusive lock value and the prior value of the shared lock value.

17. The apparatus of claim 15, wherein one of the lock/hash entry slots of the CL/CLP has an associated head pointer slot, wherein the head pointer slot is a part of the cache line of which the CL/CLP is a part, wherein the head pointer slot contains a head pointer that points to a head of a linked list of one or more stored keys, wherein each of the one or more stored keys in the linked list hashes to an entry hash value of the lock/hash entry slot.

18. The apparatus of claim 17, wherein one of the lock/hash entry slots of the CL/CLP has no associated head pointer slot that is a part of the cache line of which the CL/CLP is a part.

19. A method, comprising:
(a) maintaining a lock/hash entry in a cache memory as part of a cache line, wherein the lock/hash entry comprises an exclusive lock value, a multi-bit shared lock value, and an entry hash value, wherein the cache line includes multiple lock/hash entry slots each of which is either filled or vacant;
(b) storing a linked list of keys, wherein keys in the linked list all hash to the entry hash value;
(c) determining a first key for a first packet of a flow;
(d) determining a first hash value from the first key;
(e) reading a Cache Line or Cache Line Portion (CL/CLP) from the cache memory, wherein the CL/CLP is at least a portion of the cache line, and wherein the CL/CLP includes the lock/hash entry;
(f) from the CL/CLP read in (e) determining that the first hash value matches the entry hash value, wherein the exclusive lock value has a prior value immediately prior to the determining of (f);
(g) in response to the determining of (f) incrementing the shared lock value;
(h) from the prior value of the exclusive lock value determining that the linked list is not exclusively locked;
(i) traversing the linked list and checking to determine if the first key matches any key in the linked list, wherein (e) through (i) are initiated or performed by a first thread but are not initiated or performed by a second thread;
(j) determining a second key for a second packet of the flow;
(k) determining a second hash value from the second key;
(l) reading the CL/CLP from the cache memory;
(m) from the CL/CLP read in (l) determining that the second hash value matches the entry hash value, wherein the exclusive lock value had a prior value immediately prior to the determining of (m);
(n) in response to the determining of (m) incrementing the shared lock value;
(o) from the prior value of the exclusive lock value determining that the linked list is not exclusively locked; and
(p) traversing the linked list and checking to determine if the second key matches any key in the linked list, wherein (l) through (p) are initiated or performed by the second thread but are not initiated or performed by the first thread, wherein the traversing of (p) at least somewhat overlaps the traversing of (i) in time.

20. The method of claim 19, wherein the cache line includes a plurality of head pointer slots, wherein the cache line includes one and only one head pointer slot for each corresponding one of the lock/hash entry slots except for a first of the lock/hash entry slots for which the cache line includes no head pointer slot.

\* \* \* \* \*